US012758982B2

(12) United States Patent
Byun et al.

(10) Patent No.: US 12,758,982 B2
(45) Date of Patent: Oct. 13, 2026

(54) FOREIGN MATTER REMOVAL DEVICE

(71) Applicant: LG ELECTRONICS INC., Seoul (KR)

(72) Inventors: Yangwoo Byun, Seoul (KR); Hooyoung Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/105,241

(22) PCT Filed: Aug. 29, 2022

(86) PCT No.: PCT/KR2022/012896
§ 371 (c)(1),
(2) Date: Feb. 20, 2025

(87) PCT Pub. No.: WO2024/048804
PCT Pub. Date: Mar. 7, 2024

(65) Prior Publication Data
US 2026/0061431 A1 Mar. 5, 2026

(51) Int. Cl.
*B03C 1/18* (2006.01)

(52) U.S. Cl.
CPC ............ *B03C 1/18* (2013.01); *B03C 2201/20* (2013.01)

(58) Field of Classification Search
CPC .............................. B03C 1/18; B03C 2201/18
USPC .......................................................... 209/217
See application file for complete search history.

(56) References Cited

U.S. PATENT DOCUMENTS 10,242,977 B2 * 3/2019 Sasaki ..................... H01L 25/50
10,449,550 B2 10/2019 Oki et al.
2013/0161584 A1 6/2013 Crowder et al.
2016/0296982 A1 10/2016 Hirakawa et al.
2019/0326144 A1 10/2019 Shim et al.
2019/0371647 A1 12/2019 Ahn et al.
2022/0393074 A1 12/2022 Heo et al.
2023/0083951 A1 3/2023 Kim et al.

FOREIGN PATENT DOCUMENTS

JP 2020-25064 A 2/2020
KR 10-2006-0057167 A 5/2006
KR 10-2016-0121410 A 10/2016
(Continued)

OTHER PUBLICATIONS

International Search Report (PCT/ISA/210) Issued in PCT/KR2022/012896, dated May 23, 2023.

*Primary Examiner* — Molly K Devine
(74) *Attorney, Agent, or Firm* — Birch, Stewart, Kolasch & Birch, LLP

(57) ABSTRACT

A foreign matter removal device may include a chamber comprising a fluid, and a magnet assembly under the chamber. The chamber may include a loading section configured to load a first object, a second object, and a third object into the fluid, a first trap region configured to trap the first object, a second trap region configured to trap the second object and to be adjacent to the first trap region, and a third trap region configured to trap the third object and to be adjacent to the second trap region. The first object is a first foreign matter, the second object is a semiconductor light-emitting element, and the third object is a second foreign matter.

19 Claims, 19 Drawing Sheets

(56) References Cited

FOREIGN PATENT DOCUMENTS

| | | | |
|---|---|---|---|
| KR | 10-2019-0135862 | A | 12/2019 |
| KR | 10-2020-0021968 | A | 3/2020 |
| KR | 10-2020-0026766 | A | 3/2020 |
| WO | WO 2021/236552 | A1 | 11/2021 |

* cited by examiner

FOREIGN MATTER REMOVAL DEVICE

CROSS REFERENCE TO RELATED APPLICATIONS

This application is the National Phase of PCT International Application No. PCT/KR2022/012896, filed on Aug. 29, 2022, all of which is hereby expressly incorporated by reference into the present application.

TECHNICAL FIELD

The embodiment relates to a foreign matter removal device, and more particularly, to a device for removing various foreign matters attached to or mixed in a semiconductor light-emitting element before self-assembly on a substrate.

BACKGROUND ART

A large-area display includes a liquid crystal display (LCD), an OLED display, and a micro-LED display.

A micro-LED display is a display that uses a micro-LED, which is a semiconductor light-emitting element with a diameter or cross-sectional area of 100 μm or less, as a display element.

Since a micro-LED display uses a micro-LED, which is a semiconductor light-emitting element, as a display element, it has excellent performance in many characteristics such as contrast ratio, response speed, color reproducibility, viewing angle, brightness, resolution, lifespan, luminescence efficiency, or luminance.

In particular, a micro-LED display has the advantage of being able to freely adjust the size or resolution because the screen may be separated and combined in a modular manner, and the advantage of being able to implement a flexible display.

However, since a large micro-LED display requires millions or more micro-LEDs, there is a technical problem that makes it difficult to quickly and accurately transfer micro-LEDs to a display panel.

Recently developed transfer technologies include a pick and place process, a laser lift-off method, and a self-assembly method.

Among these, the self-assembly method is a method in which semiconductor light-emitting elements find their assembly positions within a fluid, which is advantageous for implementing a large-screen display device.

However, research on the technology for manufacturing displays through self-assembly of micro-LEDs is still insufficient.

In particular, in the case of rapidly transferring millions or more semiconductor light-emitting elements to a large display in a conventional technology, the transfer speed can be improved, but the transfer error rate can increase, which causes a technical problem in that the transfer yield decreases.

In the related technology, a self-assembly transfer process using dielectrophoresis (DEP) is being attempted, but there is a problem that the self-assembly rate is low due to the non-uniformity of the DEP force.

Meanwhile, various foreign matters may be mixed or produced in the semiconductor light-emitting element during the manufacturing or distribution process, and may be attached to or mixed with the semiconductor light-emitting element. When a semiconductor light-emitting element including such foreign matters is assembled on a substrate using the self-assembly method, it may cause a lighting defect.

That is, as illustrated in FIG. 1A, when a semiconductor light-emitting element 3 is assembled in an assembly hole 2H of a partition wall 2 disposed on the substrate 1, the semiconductor light-emitting element 3 is assembled in a tilted state due to a small foreign matter 4 attached to a lower side of the semiconductor light-emitting element 3.

In addition, as illustrated in FIG. 1B, since the size of a large foreign matter, which is an organic metal complex 5, is greater than the size of the assembly hole 2H, it is not assembled into the assembly hole 2H or is immediately detached even if it is partially assembled into the assembly hole 2H. The organic metal complex 5 is a lump in which a plurality of semiconductor light-emitting elements 3 are attached to each other by an adhesive force or are attached to each other through metal fragments 6 or large organic particles 7.

When the self-assembly process is performed without removing the small foreign matter 4 and the large foreign matter 5 included in the cluster consisting of a plurality of semiconductor light-emitting elements 3 in advance, an assembly defect as illustrated in FIG. 1A and FIG. 1B occurs. The semiconductor light-emitting element 3 having such an assembly defect cannot be electrically connected, causing a lighting defect and a problem in which the lighting yield is reduced.

Therefore, a technology capable of removing various foreign matters 4 and 5 attached to or mixed in the semiconductor light-emitting element 3 before self-assembling the semiconductor light-emitting element 3 on a display substrate is urgently required.

DISCLOSURE

Technical Problem

An object of the embodiment is to solve the foregoing and other problems.

Another object of the embodiment is to provide a foreign matter removal device capable of easily removing various foreign matters.

In addition, another object of the embodiment is to provide a foreign matter removal device capable of increasing the lighting yield.

The technical problems of the embodiments are not limited to those described in this item and include those that can be understood through the description of the invention.

Technical Solution

According to one aspect of the embodiment to achieve the above or other objects, A foreign matter removal device may comprise: a chamber comprising a fluid; and a magnet assembly under the chamber.

The chamber may comprise: a loading section configured to load a first object, a second object, and a third object into the fluid: a first trap region configured to trap the first object: a second trap region configured to trap the second object and to be adjacent to the first trap region; and a third trap region configured to trap the third object and to be adjacent to the second trap region.

The magnet assembly may repeatedly reciprocate at least one or more magnet through the first trap region, the second trap region, and the third trap region.

The first object may be a first foreign matter, the second object may be a semiconductor light-emitting element, and the third object may be a second foreign matter.

An intensity of magnetization of the second object may be greater than an intensity of magnetization of the first object, and an intensity of magnetization of the third object may be greater than the intensity of magnetization of the second object.

A size of the second object may be greater than a size of the first object, and a size of the third object may be greater than the size of the second object.

The magnet assembly may comprise a plurality of magnet assemblies along a width direction of the first trap region, the second trap region, and the third trap region, and the plurality of magnet assemblies may each comprise: at least one or more magnet: a rail on which the at least one or more magnet is mounted and which repeatedly reciprocates the at least one or more magnet through the first trap region, the second trap region, and the third trap region; and at least one or more motor configured to drive the rail.

The rail may reciprocate along an up-and-down direction relative to the first trap region, the second trap region, and the third trap region.

The rail may reciprocate along a horizontal direction relative to the first trap region, the second trap region, and the third trap region.

The first trap region may have a first trap groove having a first diameter, the second trap region may have a second trap groove having a second diameter greater than the first diameter, and the third trap region may have a third trap groove having a third diameter greater than the second diameter.

The chamber may comprise: a second loading section: a fourth trap region adjacent to the third trap region: a fifth trap region adjacent to the fourth trap region; and a sixth trap region between the fifth trap region and the first trap region.

Each of the first trap region, the second trap region, the third trap region, the fourth trap region, the fifth trap region, and the sixth trap region may be in contact at a center of the chamber and have a circular shape along an outer perimeter thereof.

The first trap region, the second trap region, and the third trap region may be symmetrical to each other with respect to the fourth trap region, the fifth trap region, and the sixth trap region with respect to the center of the chamber.

The magnet assembly may rotate the at least one or more magnet with respect to the center of the chamber to pass through the sixth trap region, the fifth trap region, the fourth trap region, the third trap region, the second trap region, and the first trap region.

The loading section may be disposed on the first trap region, and the second loading section may be disposed on the fourth trap region.

The fourth trap region may have a fourth trap groove having a fourth diameter, the fifth trap region may have a fifth trap groove having a fifth diameter greater than the fourth diameter, and the sixth trap region may have a sixth trap groove having a sixth diameter greater than the fifth diameter.

The first diameter and the fourth diameter may be the same, the second diameter and the fifth diameter may be the same, and the third diameter and the sixth diameter may be the same.

The second loading section may load the fourth object, the fifth object, and the sixth object into the fluid, the fourth trap region may trap the fourth object, the fifth trap region may trap the fifth object, and the sixth trap region may trap the sixth object.

The fourth object may be the first foreign matter, the fifth object may be the semiconductor light-emitting element, and the sixth object may be the second foreign matter.

The second trap region may trap the first object, the second object, and the third object, the second loading section may load the first object, the second object, and the third object trapped in the second trap region by using the fluid, the fourth trap region may trap the first object, the fifth trap region may trap the second object, and the sixth trap region may trap the third object.

The magnet assembly may comprise: at least one or more magnet: a support plate on which the at least one or more magnet is mounted and which rotates the at least one or more magnet with respect to a center of the chamber to pass through the first trap region, the second trap region, the third trap region, the fourth trap region, the fifth trap region, and the sixth trap region; and a motor configured to drive the support plate.

The foreign matter removal device may comprise: at least one or more liquid supply section on a first side of the chamber; and at least one or more liquid discharge section on a second side of the chamber.

The foreign matter removal device may comprise: at least one or more ultrasound generator configured to generate ultrasonic waves for supplying the fluid.

Advantageous Effects

In the embodiment, as illustrated in FIGS. 8 to 13, a plurality of trap regions 311 to 313 may be positioned at different distances from a loading section 314, and after various objects 111 to 113 are loaded through the loading section 314, as at least one or more magnet 331 and 332 reciprocate in a straight line, the various objects 111 to 113 may be trapped in the plurality of trap regions 311 to 313 due to a difference in the moving speed of the various objects 111 to 113, respectively. Thereafter, the second object 112 trapped in the second trap region 312 as a semiconductor light-emitting element may be collected, and the first object 111 and the third object 113 trapped in the first trap region 311 and the third trap region 313 as foreign matters may be removed. Accordingly, various foreign matters can be easily removed. In addition, a display device using only semiconductor light-emitting elements from which foreign matters have been removed may be manufactured, so that the lighting yield can be improved.

In an embodiment, as illustrated in FIGS. 16 to 19, a first chamber region 305-1 and a second chamber region 305-2 may be divided, and a plurality of trap regions 311 to 313 may be provided in the first chamber region 305-1, and a plurality of trap regions 315 to 317 may be provided in the second chamber region 305-2. The at least one or more magnet 331 and 332 may be rotated under the chamber 305.

As an example, since the foreign matter separation process is independently performed in the first chamber region 305-1 and the second chamber region 305-2, a faster process and a large amount of foreign matter are possible.

As another example, a first foreign matter separation process is performed in the first chamber region 305-1, so that the foreign matter may be removed primarily. Thereafter, when the first object 111 and/or the second object 112 are also trapped in the second trap region 312, where the second object 112, which is a semiconductor light-emitting element, may be trapped, the first object 111, the second object 112, and the third object 113 trapped in the second trap region 312 may be moved to the second chamber region 305-2, so that a second separation process is performed, thereby secondarily removing the foreign matter. Accordingly, since the foreign matter is removed more completely, only the second object 112 corresponding to the semiconductor light-emitting element may be collected, so that the lighting yield can be further improved when implementing the display device.

Meanwhile, as illustrated in FIG. 13 and FIG. 19, the plurality of trap regions 311 to 313 and 315 to 317 may have sizes corresponding to the sizes of the foreign matters, respectively, so that the trapping efficiency of the foreign matters can be further increased, thereby improving the removal rate of the foreign matters.

Meanwhile, as illustrated in FIG. 15 and FIG. 21, the foreign matters in the form of a lump is disintegrated by using the vibration caused by the ultrasonic waves generated by the ultrasound generators 371 and 372, so that the semiconductor light-emitting elements included in the lump is collected. Thus, the disposal rate of the semiconductor light-emitting elements can be reduced, so that the manufacturing cost can be reduced.

Additional scope of applicability of the embodiments will become apparent from the detailed description that follows. However, since various changes and modifications within the idea and scope of the embodiments may be clearly understood by those skilled in the art, the detailed description and specific embodiments, such as preferred embodiments, should be understood as being given by way of example only.

Figure 1A:
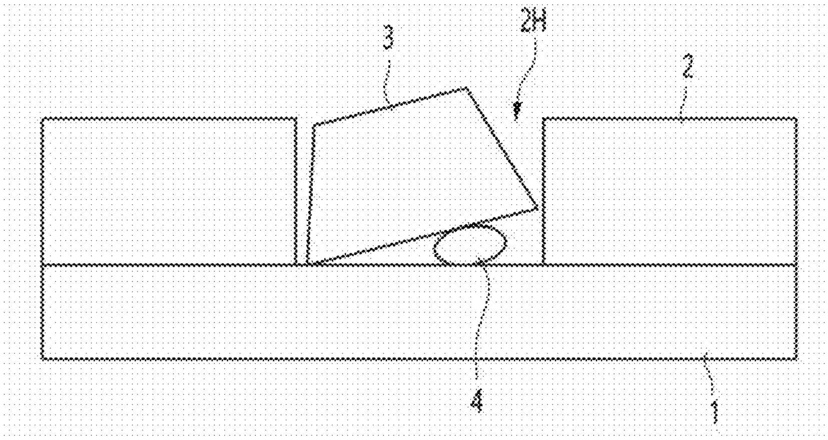
FIG. 1A and FIG. 1B illustrate an assembly defect caused by foreign matters during self-assembly.
Figure 1B:
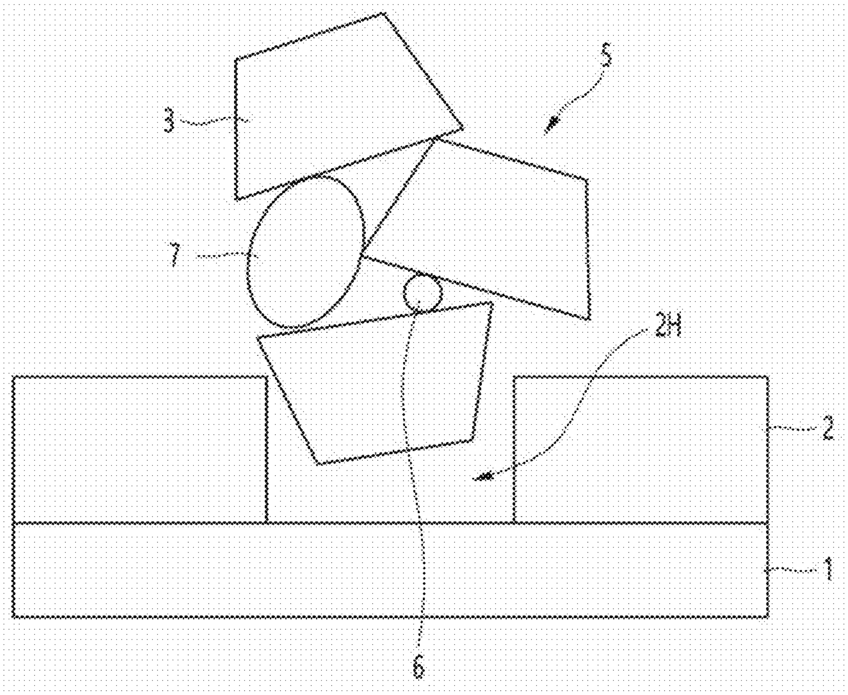

The sizes, shapes, dimensions, etc. of elements illustrated in the drawings may differ from actual ones. In addition, even if the same elements are illustrated in different sizes, shapes, dimensions, etc. between the drawings, this is only an example on the drawing, and the same elements have the same sizes, shapes, dimensions, etc. between the drawings.

MODE FOR INVENTION

Hereinafter, the embodiment disclosed in this specification will be described in detail with reference to the accompanying drawings, but the same or similar elements are given the same reference numerals regardless of reference numerals, and redundant descriptions thereof will be omitted. The suffixes 'module' and 'unit' for the elements used in the following descriptions are given or used interchangeably in consideration of ease of writing the specification, and do not themselves have a meaning or role that is distinct from each other. In addition, the accompanying drawings are for easy understanding of the embodiment disclosed in this specification, and the technical idea disclosed in this specification is not limited by the accompanying drawings. Also, when an element such as a layer, region or substrate is referred to as being 'on' another element, this means that there may be directly on the other element or be other intermediate elements therebetween.

A display device described in this specification may comprise a TV, a signage, a mobile phone, a smart phone, a head-up display (HUD) for an automobile, a backlight unit for a laptop computer, a display for VR, AR or MR (mixed reality), etc. However, the configuration according to the embodiment described in this specification may also be applied to a device capable of displaying, even if it is a new product type developed in the future.

The following describes a light-emitting element according to an embodiment and a display device comprising the same.

Figure 2:
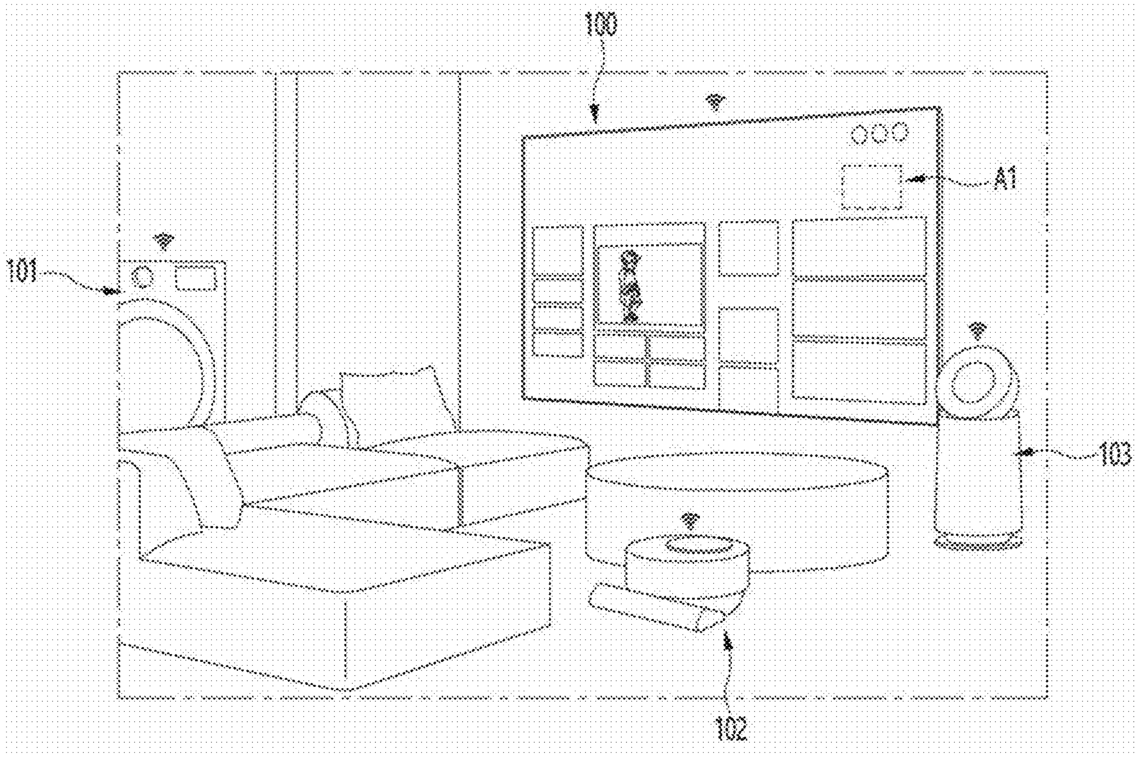
FIG. 2 illustrates a living room of a house in which a display device according to an embodiment is disposed.

FIG. 2 illustrates a living room of a house in which a display device according to an embodiment is disposed.

Referring to FIG. 2, the display device 100 of the embodiment may display the status of various electronic products such as a washing machine 101, a robot vacuum cleaner 102, and an air purifier 103, and may communicate with each electronic product based on IoT and control each electronic product based on a user's setting data.

The display device 100 according to the embodiment may comprise a flexible display manufactured on a thin and flexible substrate. The flexible display may be bent or rolled like paper while maintaining the characteristics of an existing flat panel display.

In the flexible display, visual information may be implemented by independently controlling the light emission of unit pixels disposed in a matrix form. A unit pixel means a minimum unit for implementing one color. The unit pixel of the flexible display may be implemented by a light-emitting element. In the embodiment, the light-emitting element may be a micro-LED or a nano-LED, but is not limited thereto.

Figure 3:
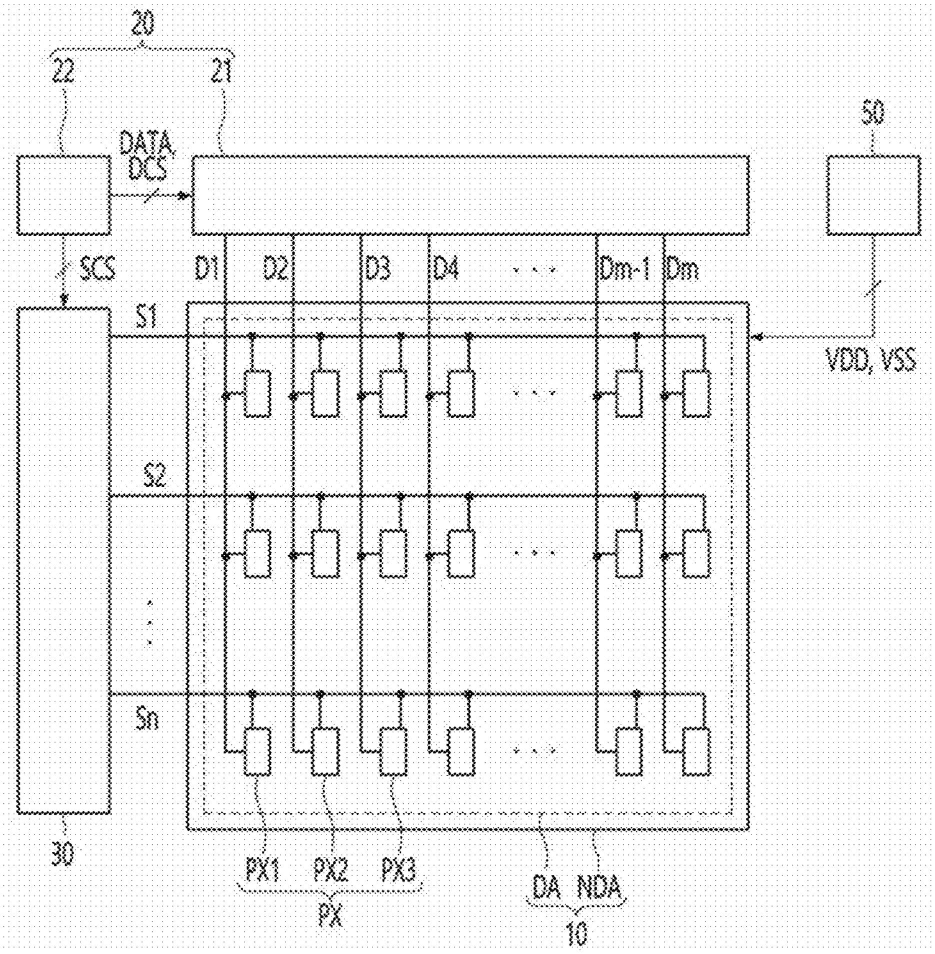
FIG. 3 is a block diagram schematically showing a display device according to an embodiment.
Figure 4:
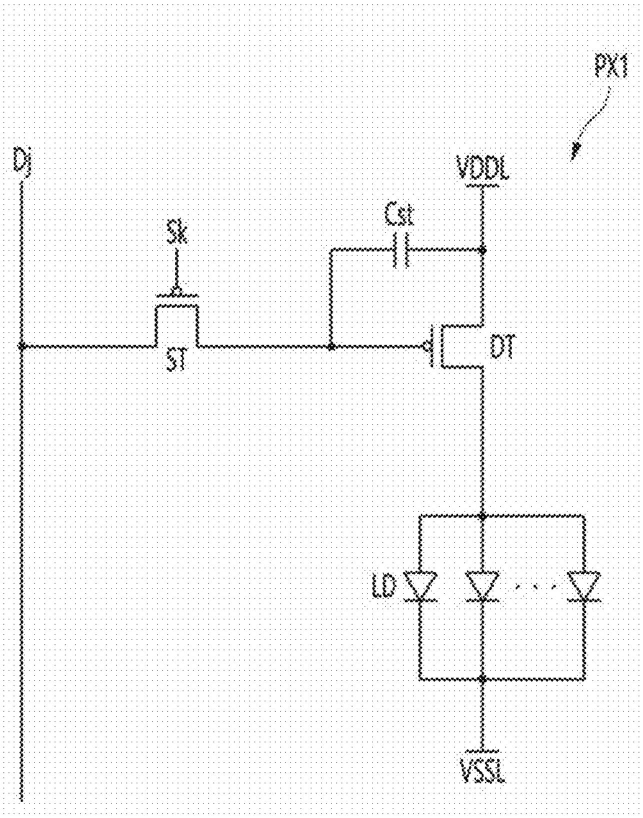
FIG. 4 is a circuit diagram showing an example of a pixel of FIG. 3.

FIG. 3 is a block diagram schematically showing a display device according to the embodiment, and FIG. 4 is a circuit diagram showing an example of a pixel of FIG. 3.

Referring to FIGS. 3 and 4, the display device according to the embodiment may comprise a display panel 10, a driving circuit 20, a scan driving unit 30, and a power supply circuit 50.

The display device 100 of the embodiment may drive a light-emitting element in an active matrix (AM) mode or a passive matrix (PM) mode.

The driving circuit 20 may comprise a data driving unit 21 and a timing control unit 22.

The display panel 10 may be formed in a rectangular shape, but is not limited thereto. That is, the display panel 10 may be formed in a circular or oval shape. At least one side of the display panel 10 may be formed to be bent at a predetermined curvature.

The display panel 10 may be divided into a display region DA and a non-display region NDA disposed around the display region DA. The display region DA is an area where pixels PX are formed and an image is displayed. The display panel 10 may comprise data lines (D1 to Dm, m is an integer greater than or equal to 2), scan lines (S1 to Sn, n is an integer greater than or equal to 2) intersecting the data lines D1 to Dm, a high-potential voltage line VDDL to which a high-potential voltage is supplied, a low-potential voltage line VSSL to which a low-potential voltage VSS is supplied, and pixels PX connected to the data lines D1 to Dm and the scan lines S1 to Sn.

Each of pixels PX may comprise a first subpixel PX1, a second subpixel PX2, and a third subpixel PX3, respectively. The first subpixel PX1 may emit a first color light of a first dominant wavelength, the second subpixel PX2 may emit a second color light of a second dominant wavelength, and the third subpixel PX3 may emit a third color light of a third dominant wavelength. The first color light may be red light, the second color light may be green light, and the third color light may be blue light, but is not limited thereto. In addition, FIG. 3 exemplifies that each of the pixels PX comprises three subpixels, but is not limited thereto. That is, each of the pixels PX may comprise four or more subpixels.

Each of the first subpixel PX1, the second subpixel PX2, and the third subpixel PX3 may be connected to at least one of the data lines D1 to Dm, at least one of the scan lines S1 to Sn, and a high-potential voltage line VDDL. The first subpixel PX1 may comprise light-emitting elements LD, a plurality of transistors for supplying current to the light-emitting elements LD, and at least one capacitor Cst, as illustrated in FIG. 4.

Although not illustrated in the drawing, each of the first subpixel PX1, the second subpixel PX2, and the third subpixel PX3 may comprise only one light-emitting element LD and at least one capacitor Cst.

Each of the light-emitting elements LD may be a semiconductor light-emitting diode comprising a first electrode, a plurality of conductivity type semiconductor layers, and a second electrode. Here, the first electrode may be an anode electrode, and the second electrode may be a cathode electrode, but is not limited thereto.

The light-emitting element LD may be one of a lateral-type light-emitting element, a flip-chip type light-emitting element, and a vertical-type light-emitting element.

The plurality of transistors may comprise a driving transistor DT for supplying current to the light-emitting elements LD, and a scan transistor ST for supplying a data voltage to a gate electrode of the driving transistor DT, as illustrated in FIG. 4. The driving transistor DT may comprise a gate electrode connected to a source electrode of the scan transistor ST, a source electrode connected to a high-potential voltage line VDDL to which a high-potential voltage is applied, and a drain electrode connected to the first electrodes of the light-emitting elements LD. The scan transistor ST may comprise a gate electrode connected to a scan line (Sk, where k is an integer satisfying $1 \leq k \leq n$), a source electrode connected to the gate electrode of the driving transistor DT, and a drain electrode connected to a data line (Dj, where j is an integer satisfying $1 \leq j \leq m$).

A capacitor Cst is formed between the gate electrode and the source electrode of the driving transistor DT. The storage capacitor Cst charges the difference between the gate voltage and the source voltage of the driving transistor DT.

The driving transistor DT and the scan transistor ST may be formed as thin film transistors. In addition, FIG. 4 mainly describes the case where the driving transistor DT and the scan transistor ST are formed as P-type metal oxide semiconductor field effect transistors (MOSFETs), but the present invention is not limited thereto. The driving transistor DT and the scan transistor ST may also be formed as N-type MOSFETs. In this instance, the positions of the source electrode and the drain electrode of each of the driving transistor DT and the scan transistor STs may be changed.

In addition, FIG. 4 exemplifies the case where each of the first subpixel PX1, the second subpixel PX2, and the third subpixel PX3 comprises 2TIC (2 Transistor-1 capacitor) having one driving transistor DT, one scan transistor ST, and one capacitor Cst, but the present invention is not limited thereto. Each of the first subpixel PX1, the second subpixel PX2, and the third subpixel PX3 may comprise a plurality of scan transistors STs and a plurality of capacitors Csts.

Since the second subpixel PX2 and the third subpixel PX3 may be implemented by substantially the same circuit diagram as the first subpixel PX1, a detailed description thereof will be omitted.

The driving circuit 20 outputs signals and voltages for driving the display panel 10. To this end, the driving circuit 20 may comprise a data driving unit 21 and a timing control unit 22.

The data driving unit 21 receives digital video data DATA and a source control signal DCS from the timing control unit 22. The data driving unit 21 converts digital video data DATA into analog data voltages according to the source control signal DCS and supplies the converted analog data to data lines D1 to Dm of the display panel 10.

The timing control unit 22 receives digital video data DATA and timing signals from the host system. The timing signals may comprise a vertical synchronization signal, a horizontal synchronization signal, a data enable signal, and a dot clock. The host system may be an application processor of a smartphone or tablet PC, a monitor, a system on chip of a TV, etc.

The timing control unit 22 generates control signals for controlling the operation timing of the data driving unit 21 and the scan driving unit 30. The control signals may comprise a source control signal DCS for controlling the operation timing of the data driving unit 21 and a scan control signal SCS for controlling the operation timing of the scan driving unit 30.

The driving circuit 20 may be disposed in a non-display region NDA provided on one side of the display panel 10. The driving circuit 20 may be formed as an integrated circuit (IC) and mounted on the display panel 10 in a chip on glass (COG) manner, a chip on plastic (COP) manner, or an ultrasonic bonding manner, but the present invention is not limited thereto. For example, the driving circuit 20 may be mounted on a circuit board (not illustrated) other than the display panel 10.

The data driving unit 21 may be mounted on the display panel 10 in a chip on glass (COG) manner, a chip on plastic (COP) manner, or an ultrasonic bonding manner, and the timing control unit 22 may be mounted on the circuit board.

The scan driving unit 30 receives a scan control signal SCS from the timing control unit 22. The scan driving unit 30 generates scan signals according to the scan control signal SCS and supplies them to the scan lines S1 to Sn of the display panel 10. The scan driving unit 30 may comprise a plurality of transistors and may be formed in a non-display region NDA of the display panel 10. Alternatively, the scan driver 30 may be formed as an integrated circuit, in which case it may be mounted on a gate flexible film attached to the other side of the display panel 10.

The circuit board may be attached to pads provided on one edge of the display panel 10 using an anisotropic conductive film. As a result, lead lines of the circuit board may be electrically connected to the pads. The circuit board may be a flexible film such as a flexible printed circuit board, a printed circuit board, or a chip on film. The circuit board may be bent to a lower part of the display panel 10. As a result, one side of the circuit board may be attached to one edge of the display panel 10, and the other side may be disposed on the lower part of the display panel 10 and connected to a system board on which a host system is mounted.

The power supply circuit 50 may generate voltages necessary for driving the display panel 10 from a main power supply applied from the system board and supply the voltages to the display panel 10. For example, the power supply circuit 50 may generate a high-potential voltage VDD and a low-potential voltage VSS for driving the light-emitting elements LD of the display panel 10 from the main power supply and supply them to the high-potential voltage line VDDL and the low-potential voltage line VSSL of the display panel 10. In addition, the power supply circuit 50 may generate and supply driving voltages for driving the driving circuit 20 and the scan driving unit 30 from the main power supply.

Figure 5:
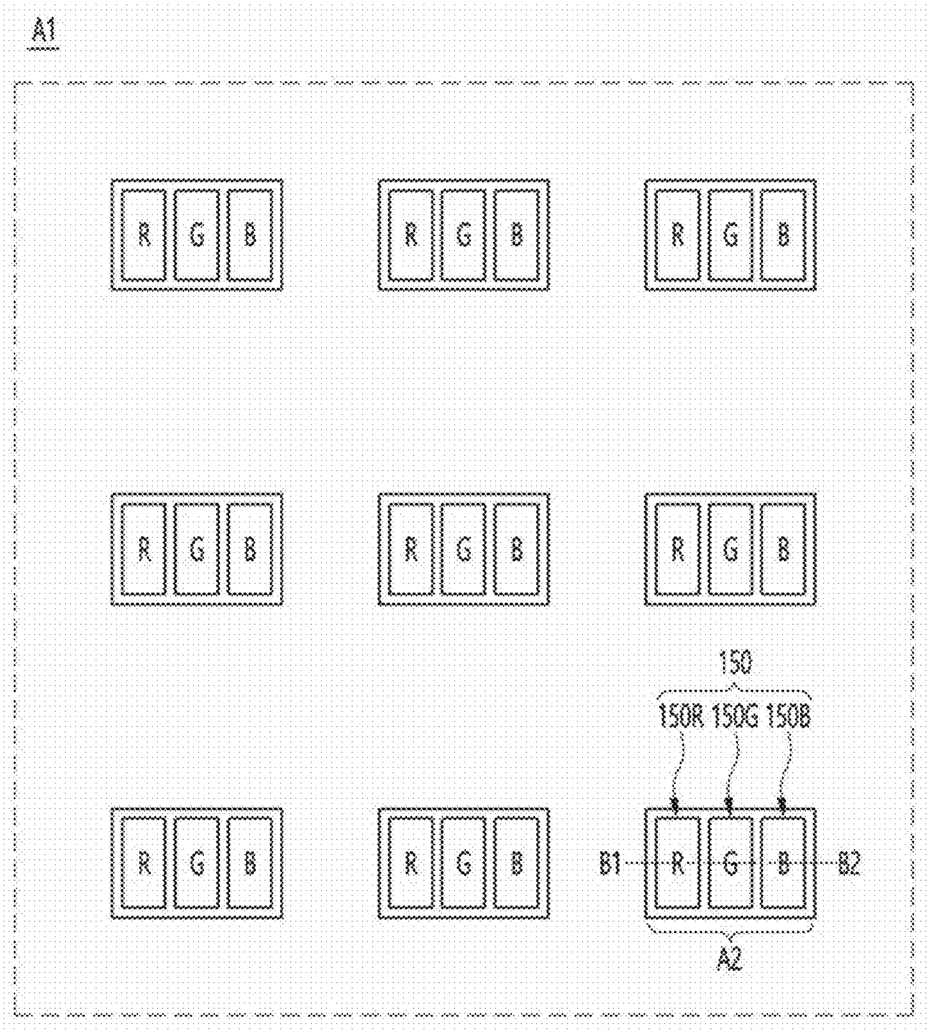
FIG. 5 is an enlarged view of the first panel region in the display device of FIG. 2.

FIG. 5 is an enlarged view of the first panel region in the display device of FIG. 3.

Referring to FIG. 5, the display device 100 of the embodiment may be manufactured by mechanically and electrically connecting a plurality of panel regions such as the first panel region A1 by tiling.

The first panel region A1 may comprise a plurality of semiconductor light-emitting elements 150 disposed for each unit pixel (PX of FIG. 3).

For example, the unit pixel PX may comprise a first subpixel PX1, a second subpixel PX2, and a third subpixel PX3. For example, a plurality of red semiconductor light-emitting elements 150R may be disposed in the first subpixel PX1, a plurality of green semiconductor light-emitting elements 150G may be disposed in the second subpixel PX2, and a plurality of blue semiconductor light-emitting elements 150B may be disposed in the third subpixel PX3. The unit pixel PX may further comprise a fourth subpixel in which no semiconductor light-emitting elements are disposed, but is not limited thereto.

Figure 6:
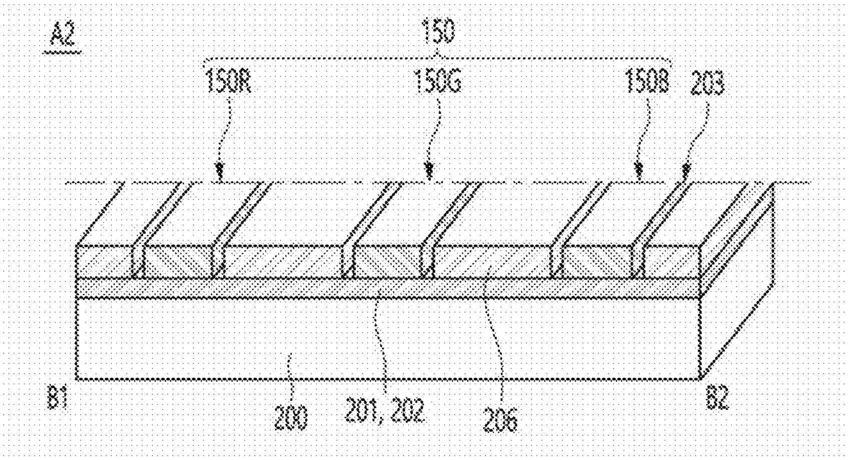
FIG. 6 is an enlarged view of a region A2 of FIG. 5.

FIG. 6 is an enlarged view of a region A2 of FIG. 5.

Referring to FIG. 6, the display device 100 of the embodiment may comprise a substrate 200, assembly wirings 201 and 202, an insulating layer 206, and a plurality of semiconductor light-emitting elements 150. More components may be included than these.

The assembly wirings may comprise a first assembly wiring 201 and a second assembly wiring 202 that are spaced apart from each other. The first assembly wiring 201 and the second assembly wiring 202 may be provided to generate a dielectrophoretic force (DEP force) to assemble the semiconductor light-emitting element 150. For example, the semiconductor light-emitting element 150 may be one of a lateral-type semiconductor light-emitting element, a flip-chip type semiconductor light-emitting element, and a vertical-type semiconductor light-emitting element.

The semiconductor light-emitting element 150 may comprise, but is not limited thereto, a red semiconductor light-emitting element 150R, a green semiconductor light-emitting element 150G, and a blue semiconductor light-emitting element 150B to form a unit pixel, respectively, and may also comprise a red phosphor and a green phosphor to implement red and green, respectively.

The substrate 200 may be a support member that supports components disposed on the substrate 200 or a protective member that protects the components.

The substrate 200 may be a rigid substrate or a flexible substrate. The substrate 200 may be formed of sapphire, glass, silicon, or polyimide. In addition, the substrate 200 may comprise a flexible material such as polyethylene naphthalate (PEN), polyethylene terephthalate (PET). In addition, the substrate 200 may be a transparent material, but is not limited thereto. The substrate 200 may function as a support substrate in a display panel, and may also function as an assembly substrate when self-assembling a light-emitting element.

The substrate 200 may be a backplane equipped with circuits, such as transistors ST and DT, capacitors Cst, and signal wirings, within the subpixels PX1, PX2, and PX3 illustrated in FIGS. 3 and 4, but is not limited thereto.

The insulating layer 206 may comprise an insulating and flexible organic material such as polyimide, PAC, PEN, PET, polymer, or an inorganic material such as silicon oxide ($SiO_2$) or silicon nitride series (SiNx), and may be formed integrally with the substrate 200 to form a single substrate.

The insulating layer 206 may be a conductive adhesive layer having adhesiveness and conductivity, and the conductive adhesive layer may have flexibility to enable a flexible function of the display device. For example, the insulating layer 206 may be a conductive adhesive layer such as an anisotropic conductive film (ACF) or an anisotropic conductive medium, a solution comprising conductive particles, etc. The conductive adhesive layer may be a layer that is electrically conductive in a vertical direction relative to the thickness, or electrically insulating in a horizontal direction relative to the thickness.

The insulating layer 206 may comprise an assembly hole 203 for inserting a semiconductor light-emitting element 150. Therefore, during self-assembly, the semiconductor light-emitting element 150 may be easily inserted into the assembly hole 203 of the insulating layer 206. The assembly hole 203 may be called an insertion hole, a fixing hole, an alignment hole, etc. The assembly hole 203 may also be called a hole.

The assembly hole 203 may be called a hole, a groove, a recess, a pocket, etc.

The assembly holes 203 may be different depending on the shapes of the semiconductor light-emitting elements 150. For example, the red semiconductor light-emitting element, the green semiconductor light-emitting element, and the blue semiconductor light-emitting element have different shapes, and may have the assembly holes 203 having the shapes corresponding to the shapes of these semiconductor light-emitting elements. For example, the assembly holes 203 may comprise a first assembly hole for assembling the red semiconductor light-emitting element, a second assembly hole for assembling the green semiconductor light-emitting element, and a third assembly hole for assembling the blue semiconductor light-emitting element. For example, the red semiconductor light-emitting element may have a circular shape, the green semiconductor light-emitting element may have a first oval shape having a first minor axis and a second major axis, and the blue semiconductor light-emitting element may have a second oval shape having a second minor axis and a second major axis, but is not limited thereto. The second major axis of the oval shape of the blue semiconductor light-emitting element may be greater than the first major axis of the oval shape of the green semiconductor light-emitting element, and the second minor axis of the oval shape of the blue semiconductor light-emitting element may be smaller than the first minor axis of the oval shape of the green semiconductor light-emitting element.

Meanwhile, the method of mounting the semiconductor light-emitting element 150 on the substrate 200 may comprise, for example, a self-assembly method (FIG. 7) and a transfer method.

Figure 7:
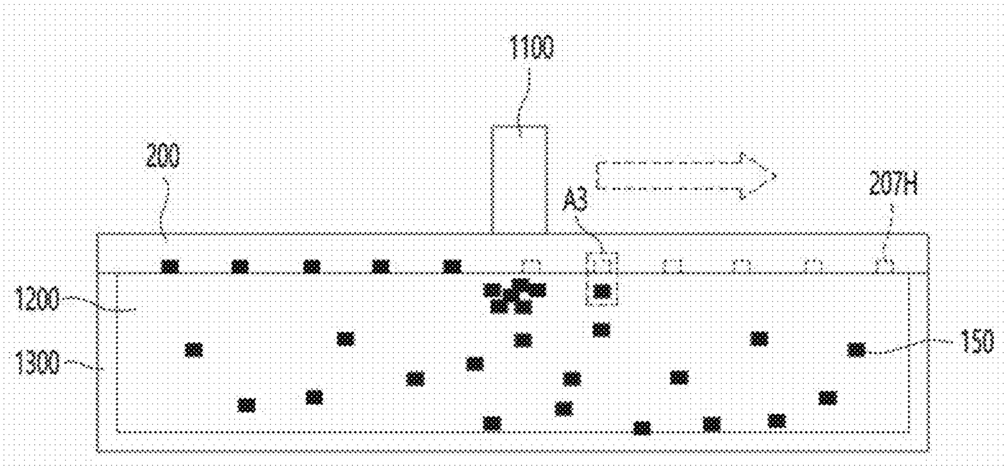
FIG. 7 is a drawing showing an example in which a light-emitting element according to an embodiment is assembled to a substrate by a self-assembly method.

FIG. 7 is a drawing illustrating an example of assembling a light-emitting element according to an embodiment onto a substrate by a self-assembly method.

Based on FIG. 7, an example of assembling a semiconductor light-emitting element according to an embodiment onto a display panel by a self-assembly method using an electromagnetic field will be described.

The assembled substrate 200 described below may also function as a panel substrate in a display device after assembling the light-emitting element, but the embodiment is not limited thereto.

Referring to FIG. 7, the semiconductor light-emitting element 150 may be put into a chamber 1300 filled with a fluid 1200, and the semiconductor light-emitting element 150 may be moved to the assembly substrate 200 by a magnetic field generated from the assembly device 1100. At this time, the semiconductor light-emitting element 150 adjacent to the assembly hole 207H of the assembly substrate 200 may be assembled into the assembly hole 207H by the DEP force caused by the electric field of the assembly wirings. The fluid 1200 may be water such as ultrapure water, but is not limited thereto. The chamber may be called a tank, a container, a vessel, etc.

After the semiconductor light-emitting element 150 is put into the chamber 1300, the assembly substrate 200 may be disposed on the chamber 1300. According to an embodiment, the assembly substrate 200 may also be put into the chamber 1300.

The semiconductor light-emitting element 150 may be implemented as a vertical-type semiconductor light-emitting element as illustrated, but is not limited thereto, and a lateral-type light-emitting element may be employed.

The semiconductor light-emitting element 150 may comprise a magnetic layer (not illustrated) having a magnetic substance. The magnetic layer may comprise a metal having magnetism, such as nickel (Ni). Since the semiconductor light-emitting element 150 put into the fluid comprises the magnetic layer, it may move to the assembly substrate 200 by a magnetic field generated from the assembly device 1100. The magnetic layer may be disposed on the upper side, lower side, or both sides of the light-emitting element.

The semiconductor light-emitting element 150 may comprise a passivation layer 156 surrounding the upper surface and side surfaces. The passivation layer 156 may be formed by using an inorganic insulator, such as silica or alumina, through PECVD, LPCVD, sputtering deposition, etc. In addition, the passivation layer 156 may be formed by a method of spin coating an organic material such as a photoresist or a polymer material.

The semiconductor light-emitting element 150 may comprise a first conductivity type semiconductor layer 152*a*, a second conductivity type semiconductor layer 152*c*, and an active layer 152*b* disposed therebetween. The first conductivity type semiconductor layer 152*a* may be an n-type semiconductor layer, and the second conductivity type semiconductor layer 152*c* may be a p-type semiconductor layer, but is not limited thereto. The first conductivity type semiconductor layer 152*a*, the second conductivity type semiconductor layer 152*c*, and the active layer 152*b* disposed therebetween may constitute a light-emitting portion 152. The light-emitting portion 152 may be called a light-emitting layer, a light-emitting region, etc.

The first electrode (layer) 154*a* may be disposed under the first conductivity type semiconductor layer 152*a*, and the second electrode (layer) 154*b* may be disposed on the second conductivity type semiconductor layer 152*c*. To this end, a part of the first conductivity type semiconductor layer 152*a* or the second conductivity type semiconductor layer 152*c* may be exposed to the outside. Accordingly, after the semiconductor light-emitting element 150 is assembled on the assembly substrate 200, a part of the passivation layer 156 may be etched in the manufacturing process of the display device.

The first electrode 154*a* may comprise at least one or more layer. For example, the first electrode 154*a* may comprise an ohmic layer, a reflective layer, a magnetic layer, a conductive layer, an anti-oxidation layer, an adhesive layer, etc. The ohmic layer may comprise Au, AuBe, etc. The reflective layer may comprise Al, Ag, etc. The magnetic layer may comprise Ni, Co, etc. The conductive layer may comprise Cu, etc. The anti-oxidation layer may comprise Mo, etc. The adhesive layer may comprise Cr, Ti, etc.

The second electrode 154*b* may comprise a transparent conductive layer. For example, the second electrode 154*b* may comprise ITO, IZO, etc.

The assembly substrate 200 may comprise a pair of first assembly wirings 201 and second assembly wirings 202 corresponding to the semiconductor light-emitting elements 150 to be assembled. Each of the first assembly wirings 201 and the second assembly wirings 202 may be formed by laminating a single metal or a metal alloy, a metal oxide, etc. in multiple layers. For example, each of the first assembly wirings 201 and the second assembly wirings 202 may be formed by comprising at least one of Cu, Ag, Ni, Cr, Ti, Al, Rh, Pd, Ir, Ru, Mg, Zn, Pt, Au, Hf, but is not limited thereto.

The first assembly wiring 201 and the second assembly wiring 202 may form an electric field when an AC voltage is applied, and the semiconductor light-emitting element 150 inserted into the assembly hole 207H may be fixed by the DEP force caused by the electric field. The gap between the first assembly wiring 201 and the second assembly wiring 202 may be smaller than the width of the semiconductor light-emitting element 150 and the width of the assembly hole 207H, and the assembly position of the semiconductor light-emitting element 150 may be fixed more precisely using the electric field.

An insulating layer 215 may be formed on the first assembly wiring 201 and the second assembly wiring 202 to protect the first assembly wiring 201 and the second assembly wiring 202 from the fluid 1200 and prevent leakage of current flowing in the first assembly wiring 201 and the second assembly wiring 202. For example, the insulating layer 215 may be formed of an inorganic insulator such as silica or alumina, or an organic insulator in a single layer or multiple layers. The insulating layer 215 may have a minimum thickness for preventing damage to the first assembly wiring 201 and the second assembly wiring 202 during assembly of the semiconductor light-emitting element 150, and may have a maximum thickness for stably assembling the semiconductor light-emitting element 150.

A partition wall 207 may be formed on an upper part of the insulating layer 215. A part of the partition wall 207 may be positioned on the upper parts of the first assembly wiring 201 and the second assembly wiring 202, and the remaining region may be positioned on an upper part of the assembly substrate 200.

Meanwhile, when manufacturing the assembly substrate 200, a part of the partition wall formed on the upper part of the insulating layer 215 may be removed, thereby forming the assembly holes 207H in which the semiconductor light-emitting elements 150 is coupled and assembled to the assembly substrate 200.

The assembly substrate 200 may have the assembly holes 207H in which the semiconductor light-emitting elements 150 are coupled, and a surface on which the assembly hole 207H is formed may be in contact with a fluid 1200. The assembly hole 207H may guide the exact assembly position of the semiconductor light-emitting element 150.

Meanwhile, the assembly hole 207H may have a shape and size corresponding to the shape of the semiconductor light-emitting element 150 to be assembled at the corresponding position. Accordingly, it is possible to prevent another semiconductor light-emitting element from being assembled in the assembly hole 207H or a plurality of semiconductor light-emitting elements from being assembled.

Referring again to FIG. 7, after the assembly substrate 200 is disposed in the chamber, the assembly device 1100 that applies a magnetic field may move along the assembly substrate 200. The assembly device 1100 may be a permanent magnet or an electromagnet.

The assembly device 1100 may move in contact with the assembly substrate 200 in order to maximize a region where the magnetic field is applied within the fluid 1200. Depending on the embodiment, the assembly device 1100 may comprise a plurality of magnetic substances or a magnetic substance having a size corresponding to the assembly substrate 200. In this instance, the movement distance of the assembly device 1100 may be limited within a predetermined range.

The semiconductor light-emitting element 150 in the chamber 1300 may move toward the assembly device 1100 and the assembly substrate 200 by the magnetic field generated by the assembly device 1100.

The semiconductor light-emitting element 150 may enter the assembly hole 207H and be fixed by the DEP force formed by the electric field between the assembly wirings 201 and 202 while moving toward the assembly device 1100.

Specifically, the first and second assembly wirings 201 and 202 may form an electric field by the AC power source, and the DEP force may be formed between the assembly wirings 201 and 202 by this electric field. The semiconductor light-emitting element 150 may be fixed to the assembly hole 207H on the assembly substrate 200 by this DEP force.

At this time, a predetermined solder layer (not illustrated) may be formed between the semiconductor light-emitting element 150 assembled on the assembly hole 207H of the assembly substrate 200 and the assembly wirings 201 and 202 to improve the bonding strength of the semiconductor light-emitting element 150.

In addition, a molding layer (not illustrated) may be formed on the assembly hole 207H of the assembly substrate 200 after assembly. The molding layer may be a transparent resin or a resin comprising a reflective material or a scattering material.

By the self-assembly method using the electromagnetic field described above, the time required for each semiconductor light-emitting element to be assembled on the substrate may be drastically shortened, so that a large-area, high-pixel display may be implemented more quickly and economically.

Hereinafter, various embodiments for solving the above-described problem will be described with reference to FIGS. 8 to 21. The omitted description below may be easily understood from the description described above in relation to FIGS. 1 to 7 and the corresponding drawings.

First Embodiment

Figure 8:
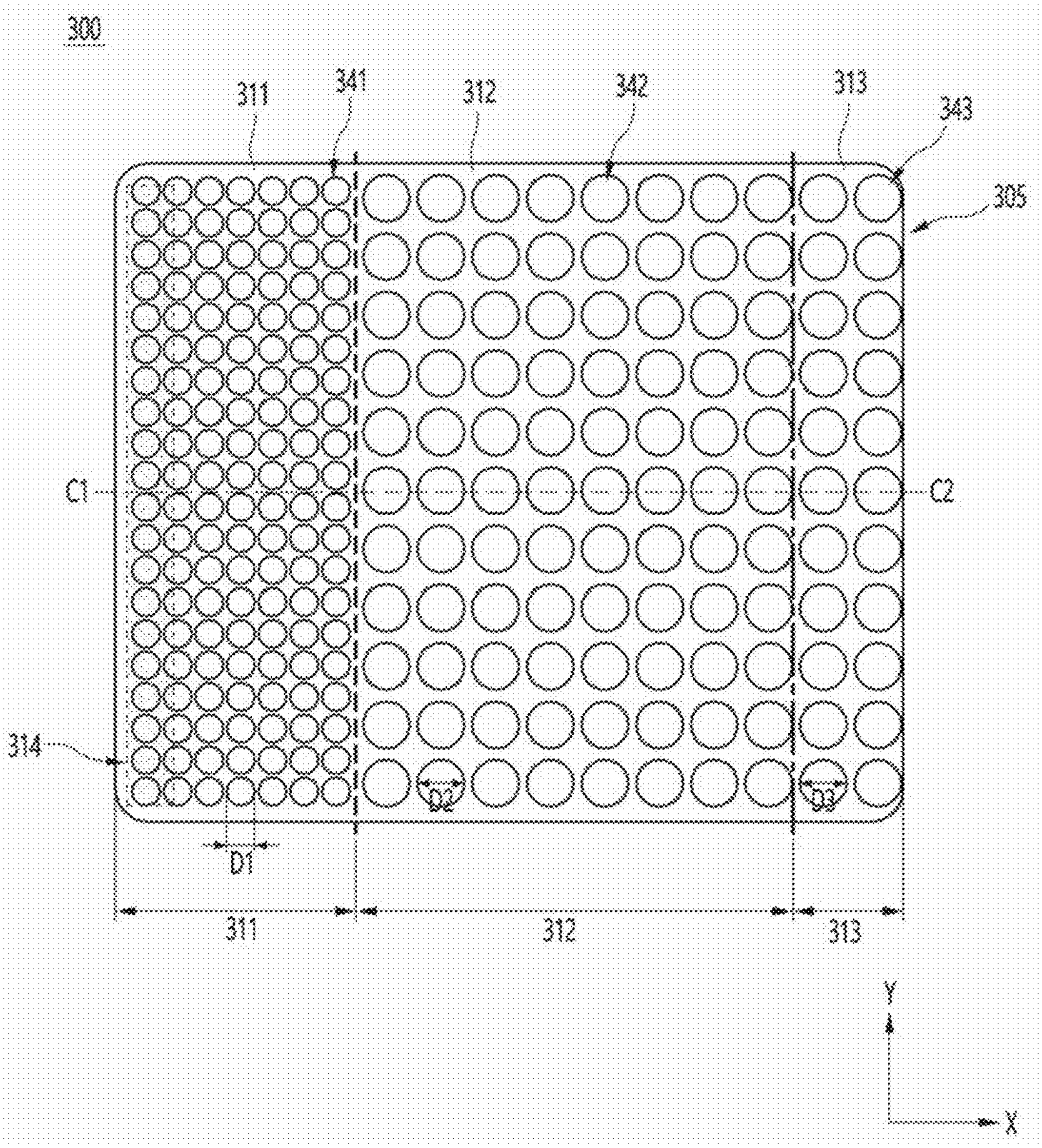
FIG. 8 is a plan view illustrating a foreign matter removal device according to a first embodiment.
Figure 9:
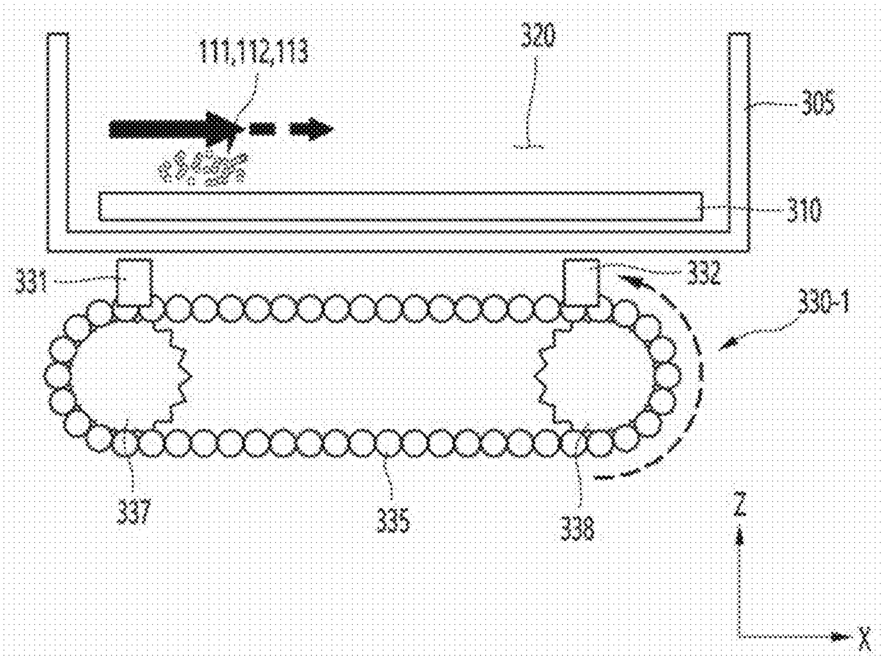
FIG. 9 is a first cross-sectional view illustrating a foreign matter removal device according to the first embodiment.
Figure 10:
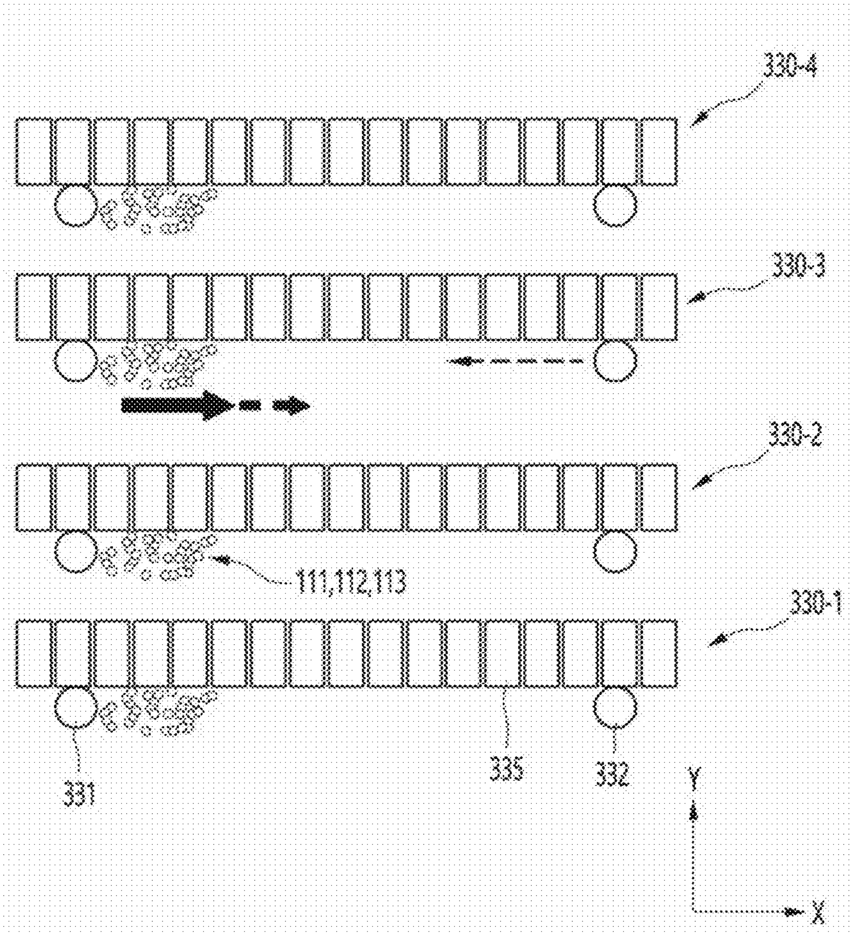
FIG. 10 is a plan view illustrating a plurality of magnet assemblies illustrated in FIG. 9.

FIG. 8 is a plan view illustrating a foreign matter removal device according to a first embodiment. FIG. 9 is a first cross-sectional view illustrating a foreign matter removal device according to the first embodiment. FIG. 10 is a plan view illustrating a plurality of magnet assemblies illustrated in FIG. 9.

Referring to FIGS. 8 to 10, the foreign matter removal device 300 according to the first embodiment may comprise a chamber 305 and a plurality of magnet assemblies 330-1 to 330-4.

The chamber 305 may comprise a fluid 320. The fluid 320 may be put into the chamber 305 and discharged out of the chamber 305. The fluid 320 may be a liquid such as water, but is not limited thereto. The chamber 305 may be rectangular when viewed from above, as illustrated in FIG. 8, but is not limited thereto.

The chamber 305 may comprise a loading section 314, a first trap region 311, a second trap region 312, and a third trap region 313.

The loading section 314 may be an inlet for loading various objects 111 to 113 into a fluid 320 within chamber 305. The objects 111 to 113 may be components used in a self-assembly process and may comprise a semiconductor light-emitting element and various foreign matters. When the various foreign matters are not removed before performing the self-assembly process, there is a problem that the various foreign matters interfere with the assembly of the semiconductor light-emitting element during the self-assembly process, resulting in a significant decrease in the lighting yield. Therefore, the various foreign matters must be removed before performing the self-assembly process.

The objects may comprise a first object 111, a second object 112, and a third object 113 having different sizes or magnetization intensities.

As an example, the intensity of magnetization of the second object 112 may be greater than the intensity of magnetization of the first object 111, and the intensity of magnetization of the third object 113 may be greater than the intensity of magnetization of the second object 112.

As another example, the size of the second object 112 may be greater than the size of the first object 111, and the size of the third object 113 may be greater than the size of the second object 112.

For example, the first object 111 may be a first foreign matter, the third object 113 may be a second foreign matter, and the second object 112 may be a semiconductor light-emitting element, but is not limited thereto.

For example, the first object 111 may be a metal fragment, an organic fragment, an inorganic fragment, a semiconductor material fragment, etc. The metal fragment, the organic fragment, the inorganic fragment, the semiconductor material fragment, etc. may be produced during the process of manufacturing the semiconductor light-emitting element or may be produced during the process of distribution.

For example, the third object 113 may be an organic lump, an inorganic lump, a metal lump, a lump composed of multiple semiconductor light-emitting elements, etc. For example, the third object 113 may be a composite lump in which at least two or more of organic, inorganic, metal, and semiconductor light-emitting elements are combined, etc.

The foreign matter removal device 300 according to the first embodiment may remove various foreign matters attached to or mixed in the semiconductor light-emitting element before performing the self-assembly process.

As an example, the first trap region 311, the second trap region 312, and the third trap region 313 may be defined on a bottom portion (or bottom surface) of the chamber 305.

As another example, the first trap region 311, the second trap region 312, and the third trap region 313 may be defined on the trap substrate 310. The trap substrate 310 may also be called a filter substrate.

The trap substrate 310 may be disposed on the bottom surface of the chamber 305. The trap substrate 310 may be detachable, but is not limited thereto.

The trap substrate 310 may comprise the first trap region 311, the second trap region 312, and the third trap region 313. The first trap region 311, the second trap region 312, and the third trap region 313 may be adjacent to each other. For example, the first trap region 311 may be adjacent to one side of the second trap region 312, and the third trap region 313 may be adjacent to the other side of the second trap region 312. The first trap region 311, the second trap region 312, and the third trap region 313 may be formed integrally in the trap substrate 310. Alternatively, although not illustrated, the trap substrate 310 may comprise a first trap substrate corresponding to the first trap region 311, a second trap substrate corresponding to the second trap region 312, and a third trap substrate corresponding to the third trap region 313.

The first trap region 311, the second trap region 312, and the third trap region 313 may be positioned adjacent to each other along the first direction X. The sizes of the first trap region 311, the second trap region 312, and the third trap region 313 may be different from each other. The size of the second trap region 312 is illustrated in the drawing to be greater than the size of the first trap region 311 or the size of the third trap region 313, but is not limited thereto.

The loading section 314 may be positioned on the first trap region 311. The loading section 314 may be disposed lengthwise along the second direction Y. The loading section 314 may be positioned on the first trap region 311 adjacent to one end of the chamber 305. Various objects 111 to 113 may be loaded onto the first trap region 311 through the loading section 314 by using a fluid 320.

The second trap region 312 may be positioned further from the loading section 314 than the first trap region 311. The third trap region 313 may be positioned further from the loading section 314 than the second trap region 312.

The objects 111 to 113 loaded into the fluid 320 on the first trap region 311 may be moved along the movement direction of at least one or more magnet 331 and 332 included in each of the plurality of magnet assemblies 330-1 to 330-4.

Each of the plurality of magnet assemblies 330-1 to 330-4 may reciprocate the at least one or more magnet 331 and 332 in a straight line. That is, each of the plurality of magnet assemblies 330-1 to 330-4 may reciprocate the at least one or more magnet 331 and 332 repeatedly along the first direction X to pass through the first trap region 311, the second trap region 312, and the third trap region 313. Accordingly, the first object 111 may be trapped in the first trap region 311, the second object 112 may be trapped in the second trap region 312, and the third object 113 may be trapped in the third trap region 313. The movement of the at least one or more magnet 331 and 332 may start when objects 111 to 113 are loaded by using fluid 320 onto the first trap region 311, but is not limited thereto.

The plurality of magnet assemblies 330-1 to 330-4 may be positioned under the chamber 305. The plurality of magnet assemblies 330-1 to 330-4 may each comprise the at least one or more magnet 331 and 332, a rail 335, and at least one or more motor 337 and 338.

The plurality of magnet assemblies 330-1 to 330-4 may reciprocate the at least one or more magnet 331 and 332 horizontally along a first direction X under the chamber 305 relative to a lower surface of the chamber 305.

The motors 337 and 338 may be positioned under both ends of chamber 305 to drive the rail 335. The axes of motors 337 and 338 may be positioned longitudinally along the second direction Y.

The motors 337 and 338 may reciprocate the rail 335 along a specific direction, for example, a first direction X. The rail 335 may reciprocate counterclockwise with respect to the axes of motors 337 and 338.

As illustrated in FIG. 9, the rail 335 may reciprocate along the up-down direction. Accordingly, the at least one or more magnet 331 and 332 mounted on the rail 335 may also reciprocate along the up-down direction.

The at least one or more magnet 331 and 332 may reciprocate along the first direction X by the rail 335. The at least one or more magnet 331 and 332 may be moved away from the loading section 314 along the first direction X and then moved closer to the loading section 314 again along the first direction.

The at least one or more magnet 331 and 332 may be positioned under the rail 335 and moved to the first trap region 311, the second trap region 312 and the third trap region 313, and then positioned on the rail 335 and moved to the third trap region 313, the second trap region 312 and the first trap region 311. When the at least one or more magnet 331 and 332 is positioned on the rail 335 compared to when it is positioned under the rail 335, the at least one or more magnet 331 and 332 mat be closer to the first object 111, the second object 112, and the third object 113 positioned on the trap substrate 310, so that a larger magnetic field may be applied to the first object 111, the second object 112, and the third object 113.

When the at least one or more magnet 331 and 332 is positioned on the rail 335 and moves toward the third trap region 313, the second trap region 312, and the first trap region 311, the first object 111, the second object 112, and the third object 113 are each magnetized by the magnetic field generated by the at least one or more magnet 331 and 332, so that they move toward the at least one or more magnet 331 and 332.

At this time, the moving speed or moving distance may vary depending on the size or magnetization strength of each of the first object 111, the second object 112, and the third object 113. As described above, the third object 113 with the largest size or magnetization strength may move at the fastest speed toward the at least one or more magnet 331 and 332, followed by the second object 112 and finally the first object 111.

Since the rotational speed of the reciprocating motion of each of the at least one or more magnet 331 and 332 is hundreds to thousands of times per minute, the first object 111, the second object 112, and the third object 113 may be distinguished from each other as a cluster by changing the distance from the loading section 314 due to the at least one or more magnet 331 and 332.

The first object 111 may have a small size and/or a weak or almost non-existent magnetization intensity, so that even if the at least one or more magnet 331 and 332 reciprocate thousands of times per minute, the first objects 111 as a first cluster may be positioned within the first trap region 311 without leaving the first trap region 311. The third object 113 may have the largest size and/or magnetization intensity, so that it may move toward the at least one or more magnet 331 and 332 compared to the first object 111 and the second object 112.

Accordingly, when the at least one or more magnet 331 and 332 reciprocate for a certain period of time, the third objects 113 as a third cluster may move to the third trap region 313. Since the second object 112 has a larger size and magnetization intensity than the first object 111 and a smaller size and magnetization intensity than the third object 113, when the at least one or more magnet 331 and 332 reciprocate for a certain period of time, the second objects 112 as a second cluster may be moved to the second trap region 312.

Meanwhile, the reciprocating motion of the at least one or more magnet 331 and 332 may be continuously performed until the third object 113 is moved from the loading section 314 to the third trap region 313, but is not limited thereto.

Although only four magnet assemblies 330-1 to 330-4 are illustrated in the drawing, fewer or more magnet assemblies may be provided.

Meanwhile, as described above, the rail 335 may reciprocate in the up-down direction (FIGS. 9 and 10). In contrast, the rail 335 may reciprocate along the horizontal direction.

Figure 11:
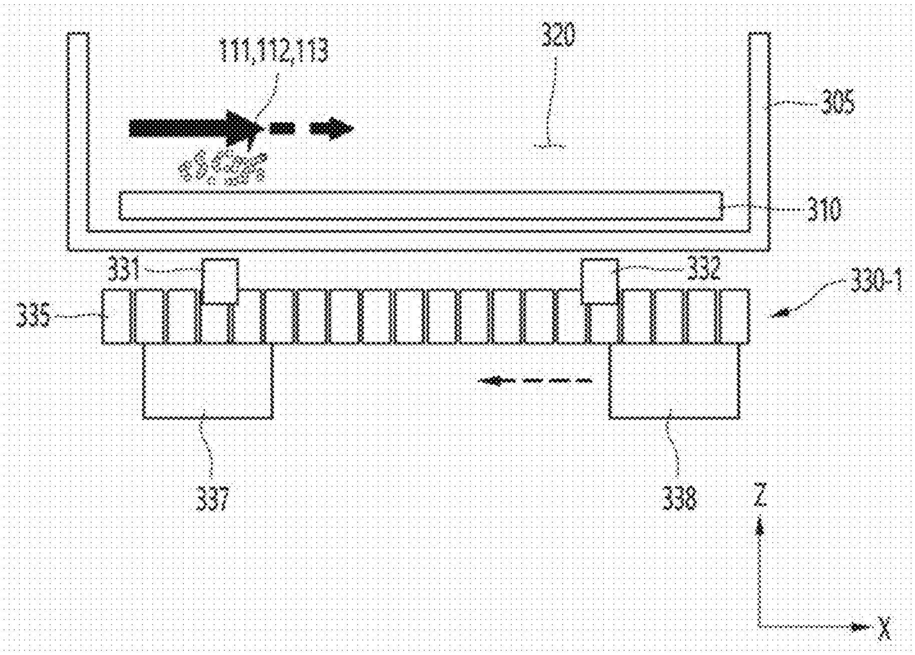
FIG. 11 is a second cross-sectional view illustrating a foreign matter removal device according to the first embodiment.
Figure 12:
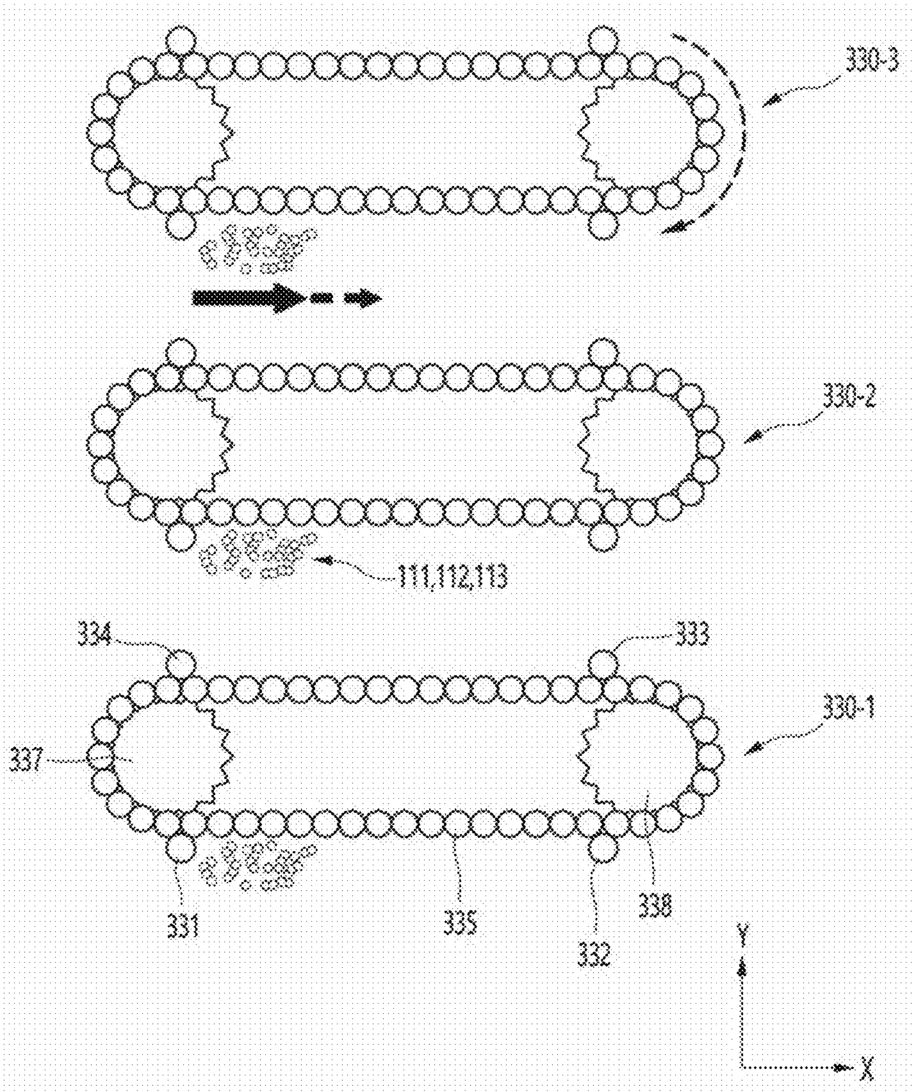
FIG. 12 is a plan view illustrating a plurality of magnet assemblies illustrated in FIG. 11.

FIG. 11 is a second cross-sectional view illustrating a foreign matter removal device according to the first embodiment. FIG. 12 is a plan view illustrating a plurality of magnet assemblies illustrated in FIG. 11.

As illustrated in FIGS. 11 and 12, the plurality of magnet assemblies 330-1 to 330-3 may comprise the at least one or more magnet 331 to 334, a rail 335, and motors 337 and 338.

The plurality of magnet assemblies 330-1 to 330-3 may reciprocate the at least one or more magnet 331 to 334 horizontally along the first direction X relative to the lower surface of the chamber 305 under the chamber 305.

The motors 337 and 338 may be positioned under both ends of chamber 305 to drive the rail 335. The axes of motors 337 and 338 may be positioned longitudinally along the third direction Z.

The motors 337 and 338 may reciprocate the rail 335 along a specific direction, for example, a first direction X. The rail 335 may reciprocate counterclockwise (or clockwise) with respect to the axes of motors 337 and 338.

As illustrated in FIG. 11, the rail 335 may reciprocate along a horizontal direction. Accordingly, the at least one or more magnet 331 to 334 mounted on the rail 335 may also reciprocate along a horizontal direction.

The at least one or more magnet 331 to 334 may reciprocate along the first direction X by the rail 335. The at least one or more magnet 331 to 334 may be moved away from the loading section 314 along the first direction X and then moved closer to the loading section 314 again along the first direction.

The at least one or more magnet 331 to 334 may be positioned at an outer side portion of the rail 335 and moved to the first trap region 311, the second trap region 312, and the third trap region 313, and then moved to the third trap region 313, the second trap region 312, and the first trap region 311 while positioned at the outer side portion of the rail 335. That is, the at least one or more magnet 331 to 334 may maintain the same distance from the lower surface of the chamber 305 while reciprocating.

When the at least one or more magnet 331 to 334 is moved to the third trap region 313, the second trap region 312, and the first trap region 311, the first object 111, the second object 112, and the third object 113 may be magnetized by the magnetic field generated by the at least one or more magnet 331 to 334, and may be moved toward the at least one or more magnet 331 to 334.

To this end, the loading section 314 may be configured as an independent loading section 314 for each location corresponding to the movement line of the at least one or more magnet 331 to 334 of each of the plurality of magnet assemblies 330-1 to 330-3 through the third trap region 313, the second trap region 312, and the first trap region 311.

As illustrated in FIG. 12, when there are three magnet assemblies 330-1 to 330-3, the loading section 314 may also be composed of three loading sections 314 that are independently partitioned. In this instance, whenever the at least one or more magnet 331 to 334 of each of the plurality of magnet assemblies 330-1 to 330-3 is moved to the third trap region 313, the second trap region 312 and the first trap region 311, the first object 111, the second object 112 and the third object 113 loaded into each loading section 314 may be moved toward the at least one or more magnet 331 to 334 at different moving speeds. Accordingly, the first object 111 may be trapped in the first trap region 311, the second object 112 may be trapped in the second trap region 312, and the third object 113 may be trapped in the third trap region 313.

At this time, the moving speed or moving distance may vary depending on the size or magnetization strength of each of the first object 111, the second object 112, and the third object 113. As described above, the third object 113 having the largest size or magnetization strength may be moved at the fastest speed toward the at least one or more magnet 331 to 334, and then the second object 112 and finally the first object 111 may be moved.

Although only three magnet assemblies 330-1 to 330-3 are illustrated in the drawing, fewer or more magnet assemblies may be provided.

Figure 13:
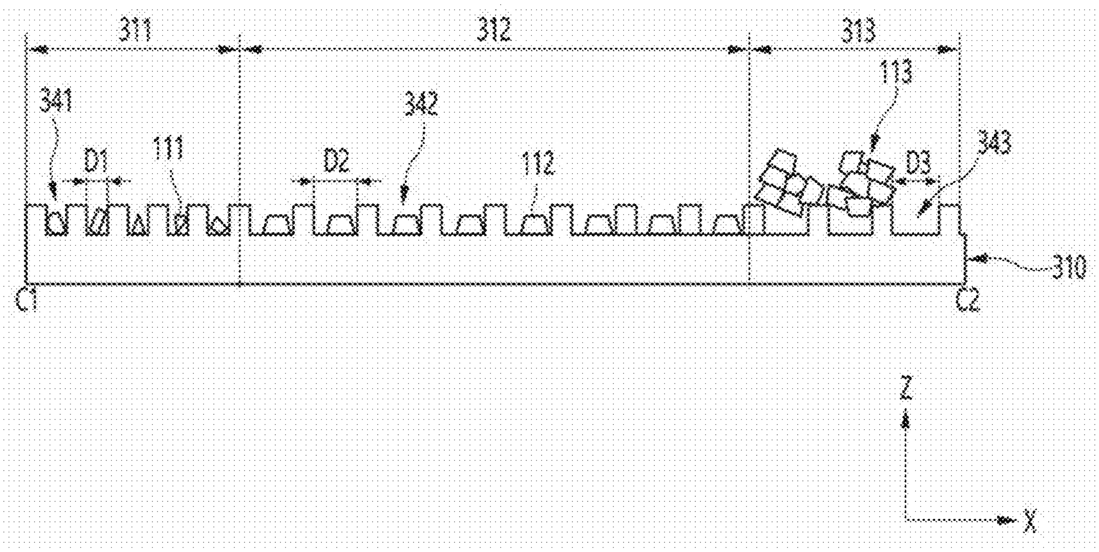
FIG. 13 is a cross-sectional view illustrating a trap substrate in detail in a foreign matter removal device according to the first embodiment.

FIG. 13 is a cross-sectional view illustrating in detail the trap substrate in the foreign matter removal device according to the first embodiment.

As illustrated in FIG. 13, the trap substrate 310 may comprise a first trap region 311, a second trap region 312, and a third trap region 313.

The first trap region 311, the second trap region 312, and the third trap region 313 may comprise a plurality of first trap grooves 341, a plurality of second trap grooves 342, and a plurality of third trap grooves 343, respectively.

The first trap groove 341, the second trap groove 342, and the third trap groove 343 may have different diameters D1, D2, and D3. In addition, the first trap groove 341, the second trap groove 342, and the third trap groove 343 may have sizes corresponding to the first object 111, the second object 112, and the third object 113, respectively.

The first trap region 311 may have a first trap groove 341 having a first diameter D1, a second trap groove 342 having a second diameter D2, and the third trap region 313 may have a third trap groove 343 having a third diameter D3.

For example, the second diameter D2 may be greater than the first diameter D1, and the third diameter D3 may be greater than the second diameter D2. For example, the third diameter D3 may be equal to the second diameter D2.

For example, the first diameter D1 may be greater than a diameter (or size) of the first object 111, the second diameter D2 may be greater than a diameter (or size) of the second object 112, and the third diameter D3 may be greater than a diameter (or size) of the third object 113.

The depths of the first trap groove 341, the second trap groove 342, and the third trap groove 343 may be different, but are not limited thereto. The depth of the first trap groove 341 may be equal to or greater than a height of the first object 111, but is not limited thereto. The depth of the second trap groove 342 may be equal to or greater than a height of the second object 112, but is not limited thereto. The depth of the third trap groove 343 may be equal to or greater than a height of the third object 113, but is not limited thereto.

Each of the first object 111, the second object 112, and the third object 113 loaded by using the fluid 320 in the loading section 314 may move away from the loading section 314 at different moving speeds due to the reciprocating motion of the at least one or more magnet 331 to 334.

For example, since the size and/or magnetization intensity of the third object 113 is the largest compared to each of the first object 111 and the second object 112, the third object 113 may move away from the loading section 314 more quickly compared to each of the first object 111 and the second object 112. Accordingly, the third object 113 may be moved to the third trap region 313 via the first trap region 311 and the second trap region 312, and may be trapped in the third trap region 313. The entirety of the third object 113 may be inserted into the third trap groove 343 of the third trap region 313, or only a part of the third object 113 may be inserted into the third trap groove 343 of the third trap region 313.

For example, since the size and/or magnetization intensity of the second object 112 is greater than that of the first object 111, the second object 112 may move away from the loading section 314 faster than that of the first object 111. Accordingly, the second object 112 may be moved to the second trap region 312 via the first trap region 311 and trapped in the second trap region 312. The entirety of the second object 112 may be inserted into the second trap groove 342 of the second trap region 312, but is not limited thereto.

For example, since the size and/or magnetization intensity of the first object 111 is the smallest compared to that of the second object 112 and the third object 113, the first object 111 may move away from the loading section 314 less than that of the second object 112 and the third object 113. When the first object 111 has a very small size or has no magnetization strength, the first object 111 may be positioned within the first trap region 311 without leaving the first trap region 311. Accordingly, the first object 111 may be trapped in the first trap groove 341 of the first trap region 311.

Although not illustrated, the trap substrate 310 may comprise a first trap substrate, a second trap substrate, and a third trap substrate that are independently separated from each other. In this instance, the first trap substrate may have a size corresponding to the first trap region 311, the second trap substrate may have a size corresponding to the second trap region 312, and the third trap substrate may have a size corresponding to the third trap region 313.

Figure 14:
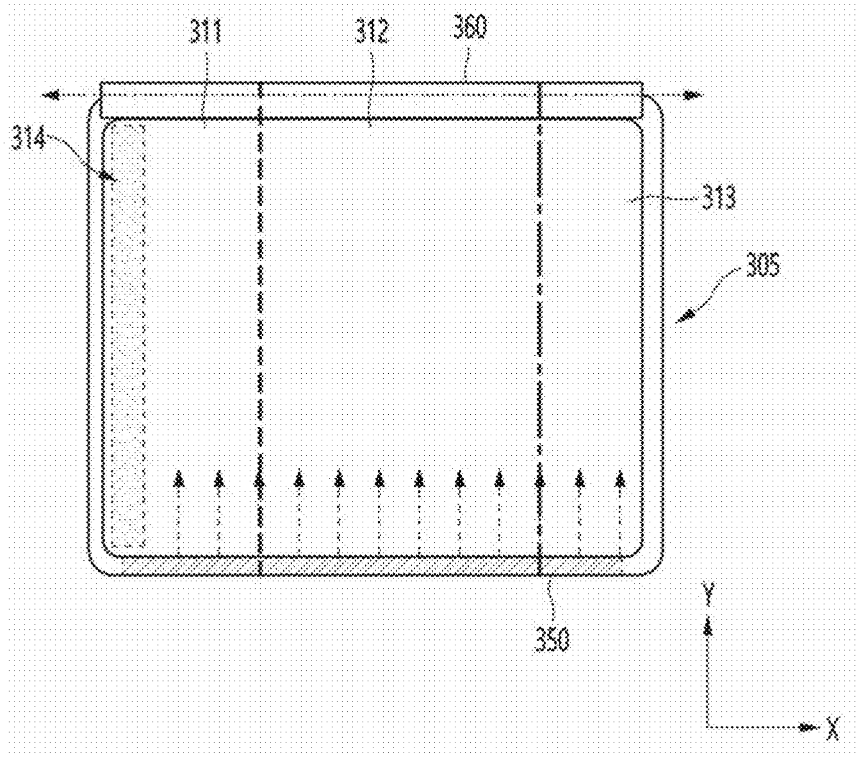
FIG. 14 is a plan view illustrating a liquid supply section and a liquid discharge section in a foreign matter removal device according to the first embodiment.
Figure 15:
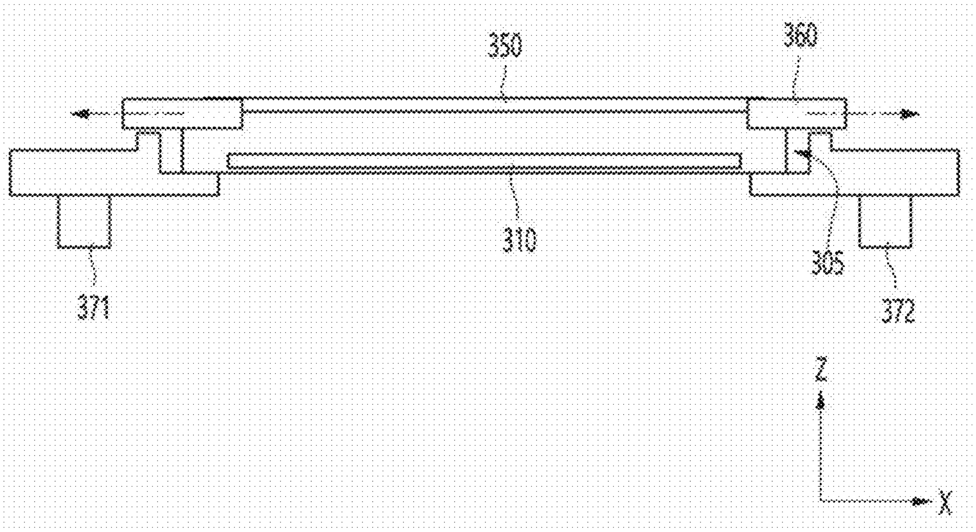
FIG. 15 is a cross-sectional view illustrating a liquid supply section, a liquid discharge section, and an ultrasound generator in a foreign matter removal device according to the first embodiment.

FIG. 14 is a plan view illustrating a liquid supply section and a liquid discharge section in a foreign matter removal device according to the first embodiment. FIG. 15 is a cross-sectional view illustrating a liquid supply section, a liquid discharge section, and an ultrasound generator in a foreign matter removal device according to the first embodiment.

Referring to FIG. 14 and FIG. 15, the foreign matter removal device 300 according to the first embodiment may comprise at least one or more liquid supply section 350, at least one or more liquid discharge section 360, and at least one or more ultrasound generator 371 and 372.

The liquid supply section 350 may be positioned on a first side of the chamber 305 and may supply liquid into the chamber 305.

The liquid supply section 350 may be a liquid supply pipe built into a first side wall positioned on the first side of the chamber 305, but is not limited thereto. The liquid supply pipe may be disposed to be lengthwise along the first direction X, but is not limited thereto. The liquid supply section 350 may comprise a plurality of nozzles (not illustrated) connected to the liquid supply pipe and the inner side of the first side wall to simultaneously supply liquid supplied from one side or both sides of the liquid supply pipe into the chamber 305. Each nozzle may be provided with a valve (not illustrated) capable of blocking the supply of liquid.

The liquid may be supplied into the chamber 305 through the liquid supply section 350, and the first object 111, the second object 112, and the third object 113 may be loaded into the fluid 320 filled in the chamber 305 through the loading section 314. Thereafter, the at least one or more magnet 331 to 334 of each of the plurality of magnet assemblies 330-1 to 330-4 may reciprocally move, so that the first object 111, the second object 112, and the third object 113 may be trapped in the first trap region 311, the second trap region 312, and the third trap region 313, respectively.

The liquid discharge section 360 may be a liquid discharge pipe built into the second side wall positioned on the second side of the chamber 305, but is not limited thereto. The liquid discharge pipe may be disposed lengthwise along the first direction X, but is not limited thereto. The liquid discharge section 360 may discharge liquid to the outside through one side or both sides of the liquid discharge pipe. The liquid discharge section 360 may comprise a plurality of nozzles (not illustrated) connected to the liquid discharge pipe and the inner side of the second side wall, so that the liquid inside the chamber 305 may be discharged to the outside simultaneously. Each nozzle may be provided with a valve (not illustrated) for blocking from the outside.

When cleaning the chamber 305 or when the fluid 320 filled in the chamber 305 is contaminated, the fluid 320 may be discharged to the outside through the liquid discharge section 360.

The liquid supply section 350 may be positioned higher from the ground than the liquid discharge section 360, so that the liquid may be filled into the chamber 305 more quickly and the liquid in the chamber 305 may be discharged to the outside more quickly. For example, the liquid supply section 350 may be positioned on an upper side of the first side wall, and the liquid discharge section 360 may be positioned on a lower side of the second side wall. The liquid discharge section 360 may be positioned higher from the ground than the trap substrate 310.

The ultrasound generator 371 and 372 may generate ultrasonic waves for supplying the fluid 320 in the chamber 305.

As described above, the third object 113 may be a composite lump in which at least two or more of organic, inorganic, metal, and semiconductor light-emitting elements are combined. Even though the semiconductor light-emitting elements included in the composite lump are a normal semiconductor light-emitting element, it may be included in the composite lump, trapped in the third trap region 313, and discarded.

However, since the ultrasonic waves generated from the ultrasound generators 371 and 372 are applied to the fluid 320 in the chamber 305, vibrations may be generated in the fluid 320 by the ultrasonic waves, and the composite lump may be disintegrated by these vibrations, and separated into organic fragments, inorganic fragments, metal fragments, semiconductor light-emitting elements, etc. In this way, since the semiconductor light-emitting element is separated from the composite lump and trapped in the second trap region 312, the discard rate of the semiconductor light-emitting element can be reduced, and the manufacturing cost can be reduced.

Although not illustrated, after the second object 112, i.e., the semiconductor light-emitting element, trapped in the second trap region 312 is collected, the first foreign matter and the second foreign matter trapped in each of the first trap region 311 and the third trap region 313 may be collected. For example, the semiconductor light-emitting element may be collected using a magnet pipette. The magnet pipette may have a built-in magnet, and the magnet may move inside and outside the housing. After the magnet pipette is positioned on the second trap region 312, the magnet may descend under the housing, so that the semiconductor light-emitting element may be attached to the magnet pipette by the magnetic field of the magnet. After the magnet pipette is moved to a collection box, the magnet is lifted and enters the inside of the housing, so that the semiconductor light-emitting element may be collected in the collection box. By repeating this process, all of the semiconductor light-emitting elements trapped in the second trap region 312 may be collected in the collection box.

Thereafter, after the liquid in the chamber 305 is discharged, the trap substrate 310 may be detached so that the first foreign matter and the third foreign matter trapped in the first trap region 311 and the third trap region 313 may be removed, respectively.

Second Embodiment

Figure 16:
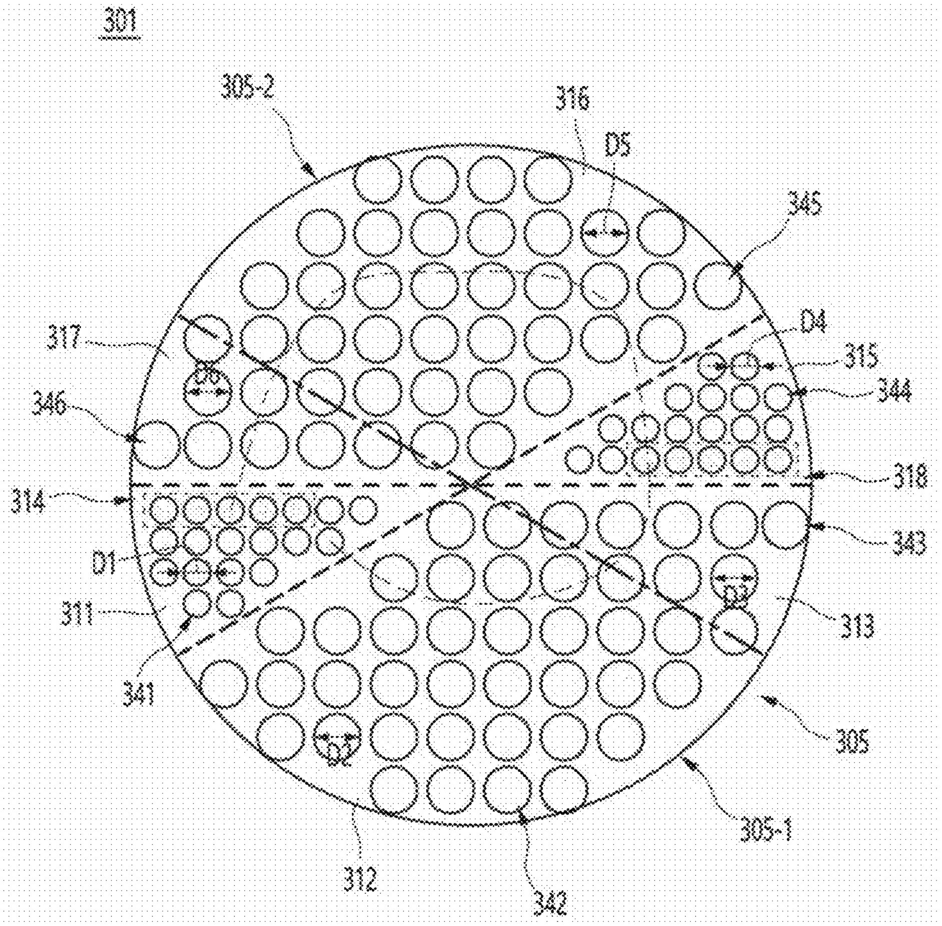
FIG. 16 is a plan view illustrating a foreign matter removal device according to a second embodiment.
Figure 17:
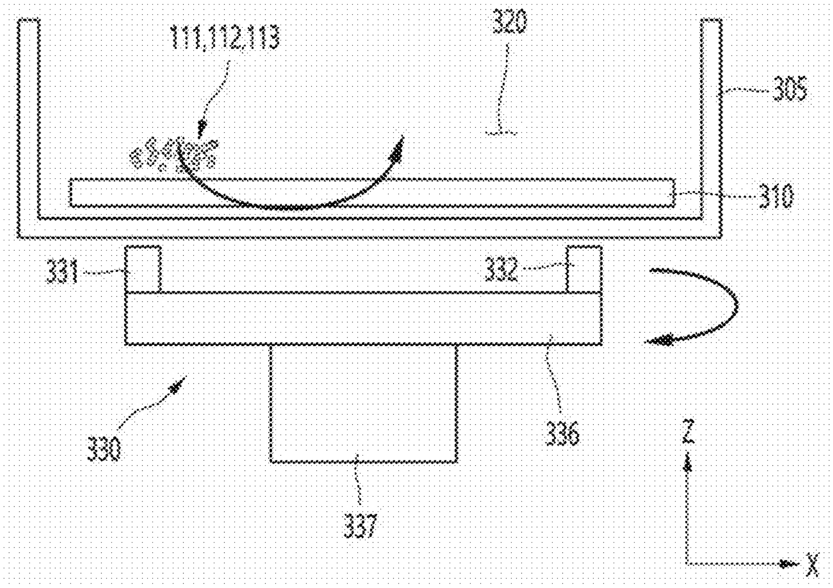
FIG. 17 is a cross-sectional view illustrating a foreign matter removal device according to the second embodiment.
Figure 18:
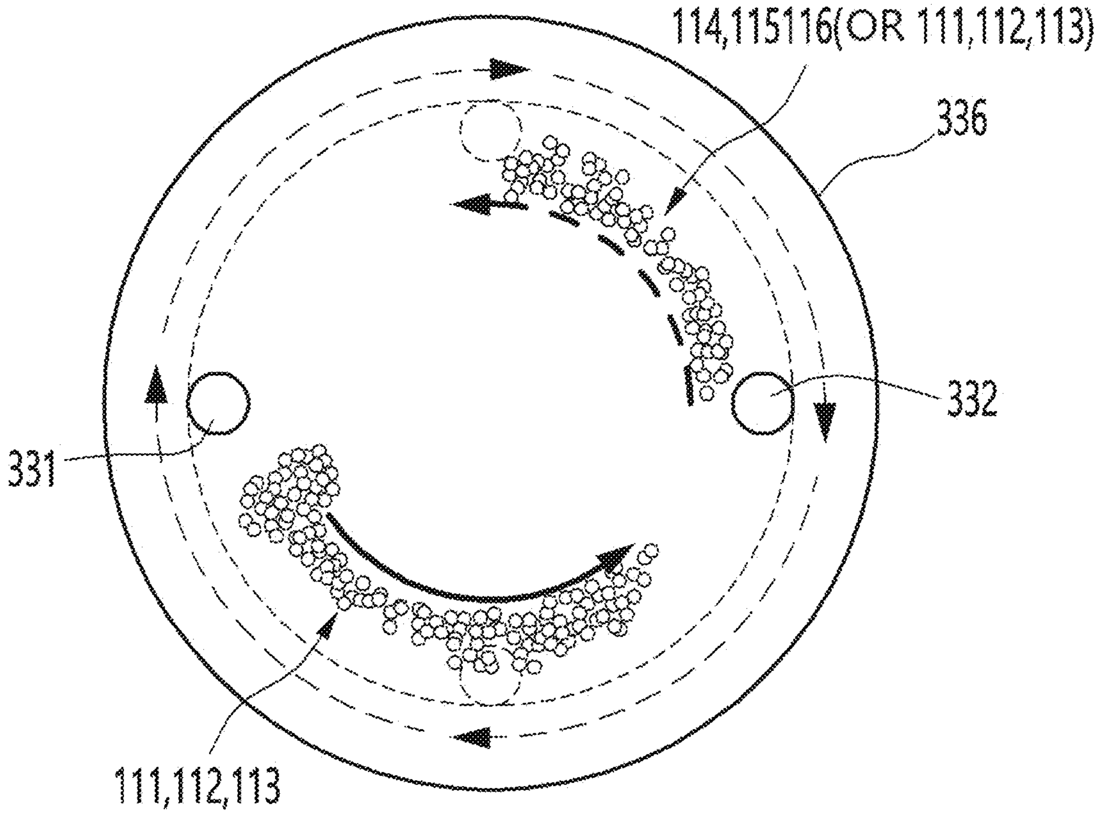
FIG. 18 is a plan view illustrating the magnet assembly illustrated in FIG. 17.

FIG. 16 is a plan view illustrating a foreign matter removal device according to a second embodiment. FIG. 17 is a cross-sectional view illustrating a foreign matter removal device according to the second embodiment. FIG. 18 is a plan view illustrating the magnet assembly illustrated in FIG. 17.

The second embodiment is similar to the first embodiment except that the at least one or more magnet 331 and 332 rotates with respect to the center of the chamber 305. In the second embodiment, components having the same shape, structure, and/or function as those of the first embodiment are given the same drawing reference numerals and detailed descriptions are omitted.

Referring to FIGS. 16 to 18, the foreign matter removal device 301 according to the second embodiment may comprise a chamber 305 and a magnet assembly 330.

The chamber 305 may have a circular shape when viewed from above, but is not limited thereto.

The chamber 305 may comprise a first chamber region 305-1 and a second chamber region 305-2. The first chamber region 305-1 and the second chamber region 305-2 may each have a hemispherical shape. The straight surface of the first chamber region 305-1 and the straight surface of the second chamber region 305-2 may be in contact with each other, but is not limited thereto. The chamber 305 having a circular shape may be formed by the first chamber region 305-1 and the second chamber region 305-2 that are in contact with each other by the straight surface.

The first chamber region 305-1 may comprise the first loading section 314, the first trap region 311, the second trap region 312, and the third trap region 313. The sizes of the first trap region 311, the second trap region 312, and the third trap region 313 may be different from each other. In the drawing, the size of the second trap region 312 is illustrated to be greater than the size of the first trap region 311 or the size of the third trap region 313, but is not limited thereto.

The first trap region 311, the second trap region 312, and the third trap region 313 may each have a piece-cake shape. The first trap region 311, the second trap region 312, and the third trap region 313 may each be in contact with the center of the chamber 305.

The first trap region 311, the second trap region 312, and the third trap region 313 may be in contact with each other. That is, the first trap region 311 may be in contact with one side of the second trap region 312, and the third trap region 313 may be in contact with the other side of the second trap region 312.

The second chamber region 305-2 may comprise the second loading section 318, the fourth trap region 315, the fifth trap region 316, and the sixth trap region 317. The sizes of the fourth trap region 315, the fifth trap region 316, and the sixth trap region 317 may be different from each other. The size of the fifth trap region 316 is illustrated in the drawing to be greater than the size of the fourth trap region 315 or the size of the sixth trap region 317, but is not limited thereto.

The fourth trap region 315, the fifth trap region 316, and the sixth trap region 317 may each have a piece-cake shape. The fourth trap region 315, the fifth trap region 316, and the sixth trap region 317 may each be in contact with the center of the chamber 305.

The fourth trap region 315, the fifth trap region 316, and the sixth trap region 317 may be in contact with each other. That is, the fourth trap region 315 may be in contact with one side of the fifth trap region 316, and the sixth trap region 317 may be in contact with the other side of the fifth trap region 316.

The first loading section 314 may be disposed on the first trap region 311 of the first chamber region 305-1, and the second loading section 318 may be disposed on the fourth trap region 315 of the second chamber region 305-2. The first loading section 314 and the second loading section 318 may be symmetrical to each other with respect to the center of the chamber 305.

The first trap region 311, the second trap region 312, the third trap region 313, the fourth trap region 315, the fifth trap region 316, and the sixth trap region 317 may each be in contact with the center of the chamber 305, and may have a circular shape along the outer perimeter thereof.

The first trap region 311 of the first chamber region 305-1 and the sixth trap region 317 of the second chamber region 305-2 may be in contact with each other, and the third trap region 313 of the first chamber region 305-1 and the fourth trap region 315 of the second chamber region 305-2 may be in contact with each other.

The first trap region 311, the second trap region 312 and the third trap region 313 may be symmetrical with each other with respect to the center of the chamber 305, respectively, with respect to the fourth trap region 315, the fifth trap region 316 and the sixth trap region 317. For example, the first trap region 311 and the fourth trap region 315 may be symmetrical with respect to the center of the chamber 305. For example, the second trap region 312 and the fifth trap region 316 may be symmetrical with respect to the center of the chamber 305. For example, the third trap region 313 and the sixth trap region 317 may be symmetrical to each other with respect to the center of the chamber 305.

Meanwhile, the first trap region 311, the second trap region 312, the third trap region 313, the fourth trap region 315, the fifth trap region 316, and the sixth trap region 317 may be defined on the trap substrate 310. The trap substrate 310 may have a shape corresponding to a shape of the chamber 305. Since the chamber 305 has a circular shape, the trap substrate 310 may also have a circular shape.

The magnet assembly 330 may rotate the at least one or more magnet 331 and 332 clockwise with respect to the center of the chamber 305. The magnet assembly 330 may rotate the at least one or more magnet 331 and 332 with respect to the center of the chamber 305 to pass through the sixth trap region 317, the fifth trap region 316, the fourth trap region 315, the third trap region 313, the second trap region 312, and the first trap region 311.

The magnet assembly 330 may comprise the at least one or more magnet 331 and 332, a support plate 336, and a motor 337, as illustrated in FIG. 17.

The magnet assembly 330 may rotate the at least one or more magnet 331 and 332 with respect to the center of the chamber 305 in a clockwise direction under the chamber 305.

The motor 337 may be positioned at the center of the chamber 305 under the chamber 305 to drive the support plate 336. The axis of the motor 337 may be positioned along the third direction Z.

As illustrated in FIG. 17, the motor 337 may rotate the support plate 336 clockwise with respect to the center of the chamber 305. The support plate 336 may rotate clockwise with respect to the axis of the motor 337. Accordingly, the at least one or more magnet 331 and 332 mounted on the support plate 336 may also rotate clockwise.

The at least one or more magnet 331 and 332 may rotate clockwise with respect to the center of the chamber 305 to pass through the sixth trap region 317, the fifth trap region 316, the fourth trap region 315, the third trap region 313, the second trap region 312, and the first trap region 311 under the chamber 305. This rotational motion may be performed repeatedly.

When the at least one or more magnet 331 and 332 is adjacent to the second loading section 318 as the at least one or more magnet 331 and 332 rotates clockwise, the fourth object 114, the fifth object 115 and the sixth object 116 (or the first object 111, the second object 112 and the third object 113) loaded by the second loading section 318 may be magnetized by the magnetic field generated by each of the at least one or more magnet 331 and 332, and may be moved toward the at least one or more magnet 331 and 332. Thereafter, when the at least one or more magnet 331 and 332 passes the fourth object 114, the fifth object 115, and the sixth object 116 (or the first object 111, the second object 112, and the third object 113) and then comes into contact with the first loading section 314 by the rotational motion, the first object 111, the second object 112, and the third object 113 loaded by the first loading section 314 may be magnetized by the magnetic fields of each of the at least one or more magnet 331 and 332, and may move toward the at least one or more magnet 331 and 332.

As the at least one or more magnet 331 and 332 repeatedly rotate clockwise, the first object 111, the second object 112, and the third object 113 loaded from the first loading section 314, as well as the fourth object 114, the fifth object 115, and the sixth object 116 loaded from the second loading section 318 (or the first object 111, the second object 112, and the third object 113) may rotate counterclockwise.

At this time, the moving speeds of the first object 111, the second object 112, the third object 113, the fourth object 114, the fifth object 115, and the sixth object 116 may be different from each other according to their sizes and/or the strengths of their magnetizations. Accordingly, by repeatedly performing the rotational motion of the at least one or more magnet 331 and 332, the first object 111, the second object 112, and the third object 113 loaded from the first loading section 314 may be trapped in the first trap region 311, the second trap region 312, and the third trap region 313, which are positioned at different distances from the first loading section 314, respectively, and the fourth object 114, the fifth object 115, and the sixth object 116 (or the first object 111, the second object 112, and the third object 113) loaded from the second loading section 318 may be trapped in the fourth trap region 315, the fifth trap region 316, and the sixth trap region 317, which are positioned at different distances from the second loading section 318, respectively.

As described above, since each of the first object 111, the second object 112, the third object 113, the fourth object 114, the fifth object 115, and the sixth object 116 has hundreds to millions of objects, the first objects 111 may be trapped as a first cluster in the first trap region 311, the second objects 112 may be trapped as a second cluster in the second trap region 312, and the third objects 113 may be trapped as a third cluster in the third trap region 313. The fourth objects 114 may be trapped as a fourth cluster in the fourth trap region 315, the fifth objects 115 may be trapped as a fifth cluster in the fifth trap region 316, and the sixth objects 116 may be trapped as a sixth cluster in the sixth trap region 317.

The foreign matter removal device 301 according to the second embodiment may be operated in two ways as follows.

[First Operation Method]

The first object 111, the second object 112, and the third object 113 may be loaded into the fluid 320 through the first loading section 314, and the fourth object 114, the fifth object 115, and the sixth object 116 may be loaded into the fluid 320 through the second loading section 318. For example, the first object 111 and the fourth object 114 may have similar (or identical) material types, similar (or identical) sizes, and/or similar (or identical) magnetization strengths. For example, the second object 112 and the fifth object 115 may have similar (or identical) material types, similar (or identical) sizes, and/or similar (or identical) magnetization strengths. For example, the third object 113 and the sixth object 116 may have similar (or identical) material types, similar (or identical) sizes, and/or similar (or identical) magnetization strengths.

For example, the first object 111 and the fourth object 114 may be first foreign matters, the second object 112 and the fifth object 115 may be semiconductor light-emitting elements, and the third object 113 and the sixth object 116 may be second foreign matters, but are not limited thereto. The first foreign matter as the first object 111 and the first foreign matter as the fourth object 114 may have similar or identical types, sizes, and/or magnetization strengths. The second foreign matter as the third object 113 and the second foreign matter as the sixth object 116 may have similar or identical types, sizes, and/or magnetization strengths. The semiconductor light-emitting element as the second object 112 and the semiconductor light-emitting element as the fifth object 115 may emit the same color light or different color light.

The at least one or more magnet 331 and 332 may be rotated clockwise with respect to the center of the chamber 305 by the magnet assembly 330.

The rotational speed of each of the at least one or more magnet 331 and 332 may be hundreds to thousands of rotations per minute.

The at least one or more magnet 331 and 332 may be rotated at a rotational speed of hundreds to thousands of rotations per minute. Accordingly, the first object 111, the second object 112, and the third object 113 loaded through the first loading section 314 may be distinguished from each other as a cluster by varying the distance from the first loading section 314 by the at least one or more magnet 331 and 332. In addition, the fourth object 114, the fifth object 115, and the sixth object 116 loaded through the second loading section 318 may be distinguished from each other as a cluster by varying the distance from the second loading section 318 by the at least one or more magnet 331 and 332.

Accordingly, the first object 111 may be trapped in the first trap region 311 of the first chamber region 305-1, the second object 112 may be trapped in the second trap region 312 of the first chamber region 305-1, and the third object 113 may be trapped in the third trap region 313 of the first chamber region 305-1. The fourth object 114 may be trapped in the fourth trap region 315 of the second chamber region 305-2, the fifth object 115 may be trapped in the fifth trap region 316 of the second chamber region 305-2, and the sixth object 116 may be trapped in the sixth trap region 317 of the second chamber region 305-2.

By the first operation method, foreign matters may be removed independently in the first chamber region 305-1 and the second chamber region 305-2, so that a large amount of foreign matter may be removed, which can drastically shorten the process time for foreign matter removal.

[Second Operation Method]

The second operation method may be divided into a first operation section and a second operation section.

<First Operation Section>

First, the first object 111, the second object 112, and the third object 113 may be loaded into the fluid 320 in the chamber 305 through the first loading section 314. Thereafter, by continuously rotating the at least one or more magnet 331 and 332 in a clockwise direction by the magnet assembly 330, the first object 111, the second object 112, and the third object 113 may be trapped in the first trap region 311, the second trap region 312, and the third trap region 313, respectively.

It is preferable that only the second object 112 is trapped in the second trap region 312. However, not only the second object 112, but also the first object 111 and the third object 113 may be trapped in the second trap region 312. In this instance, the first object 111, the second object 112, and the third object 113 may be trapped in the second trap region 312, so that only the second object 112, i.e., the semiconductor light-emitting element, may be not be collected separately from the first object 111 and the second object 112.

To solve this problem, a second operation section may be added.

<Second Operation Section>

The first object 111, the second object 112, and the third object 113 trapped in the second trap region 312 may be loaded into the fluid 320 in the chamber 305 through the second loading section 318 using the magnetic pipette.

The first object 111 may not be attached to the magnetic pipette because it has a small size and a small or no magnetization intensity. Therefore, the first object 111 may not be moved to the second loading section 318, and thus may be naturally removed. The third object 113 may be attached to the magnetic pipette because it has a large magnetization intensity but is a large lump, and thus, even if it is attached to the magnetic pipette, the fixing force with the magnetic pipette may be weak, so that the third object 113 may be detached from the magnetic pipette. Accordingly, the third object 113 may be also difficult to move to the second loading section 318, so that it may be naturally removed. Accordingly, the first object 111 or the third object 113 trapped in the second trap region 312 by the magnetic pipette is hardly moved to the second loading section 318, and mainly the second object 112 may be moved to the second loading section 318 and loaded into the fluid 320.

Therefore, a significant number of the first objects 111 or the third objects 113 may be removed by the moving process from the second trap region 312 to the second loading section 318 using the magnetic pipette.

Thereafter, by continuously rotating the at least one or more magnet 331 and 332 in a clockwise direction by the magnet assembly 330, the first object 111, the second object 112, and the third object 113 loaded through the second loading section 318 may be trapped in the fourth trap region 315, the fifth trap region 316, and the sixth trap region 317, respectively.

Accordingly, by performing two separation processes by the second operating method, the second object 112 may be completely separated from the first object 111 or the third object 113, so that only the second object 112, i.e., the semiconductor light-emitting element, may be collected. That is, by performing a first separation process by repeated rotational motion by the at least one or more magnet 331 and 332 in the first chamber region 305-1 during the first operation section, the second object 112 may be separated from the first object 111 or the third object 113. At this time, the first object 111 or the third object 113 may also be trapped in the second trap region 312 where the second object 112 is trapped.

In order to collect only the second object 112 among the first object 111, the second object 112, and the third object 113 trapped in the second trap region 312, the second separation process may be performed in the second chamber region 305-2. That is, after the first object 111, the second object 112, and the third object 113 trapped in the second trap region 312 are loaded into the second loading section 318 of the second chamber region 305-2 using the magnetic pipette, the second separation process may be performed by repeated the rotational movement by the at least one or more magnet 331 and 332. Thus, only the second object 112 may be separated from the first object 111 or the third object 113 and trapped in the fifth trap region 316, so that the second object 112 may be collected in the fifth trap region 316. The second object 112 may be collected in the fifth trap region 316 using the magnetic pipette, but is not limited thereto.

Figure 19:
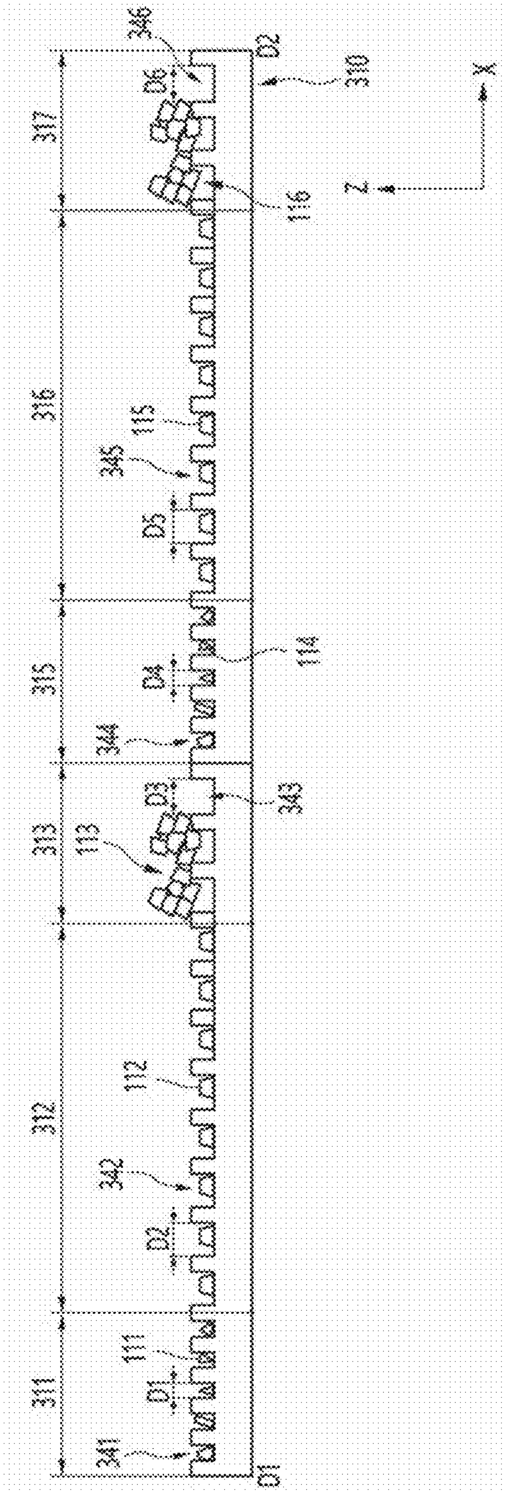
FIG. 19 is a cross-sectional view illustrating a trap substrate in detail in a foreign matter removal device according to the second embodiment.

FIG. 19 is a cross-sectional view illustrating a trap substrate in detail in a foreign matter removal device according to the second embodiment As illustrated in FIG. 19, the trap substrate 310 may comprise a first trap region 311, a second trap region 312, a third trap region 313, a fourth trap region 315, a fifth trap region 316, and a sixth trap region 317.

For example, the first trap region 311, the second trap region 312, the third trap region 313, the fourth trap region 315, the fifth trap region 316, and the sixth trap region 317 may be defined on one trap substrate 310.

Although not illustrated, the first trap region 311, the second trap region 312, the third trap region 313, the fourth trap region 315, the fifth trap region 316, and the sixth trap region 317 may be defined on independent trap substrates, respectively. That is, a first trap substrate corresponding to the first trap region 311 may be provided, a second trap substrate corresponding to the second trap region 312 may be provided, and a third trap substrate corresponding to the third trap region 313 may be provided. A fourth trap substrate corresponding to the fourth trap region 315 may be provided, a fifth trap substrate corresponding to the fifth trap region 316 may be provided, and a sixth trap substrate corresponding to the sixth trap region 317 may be provided.

As illustrated in FIG. 16, the first trap region 311, the second trap region 312, and the third trap region 313 may be disposed in the first chamber region 305-1, and the fourth trap region 315, the fifth trap region 316, and the sixth trap region 317 may be disposed in the second chamber region 305-2. In this instance, the first loading section 314 may be disposed on the first trap region 311, and the second loading section 318 may be disposed on the fourth trap region 315.

The first trap region 311, the second trap region 312, and the third trap region 313 may each comprise a plurality of first trap grooves 341, a plurality of second trap grooves 342, and a plurality of third trap grooves 343.

The first trap groove 341, the second trap groove 342, and the third trap groove 343 may have different diameters D1, D2, and D3. In addition, the first trap groove 341, the second trap groove 342, and the third trap groove 343 may have sizes corresponding to the first object 111, the second object 112, and the third object 113, respectively.

The first trap region 311 may have a first trap groove 341 having a first diameter D1, a second trap groove 342 having a second diameter D2, and the third trap region 313 may have a third trap groove 343 having a third diameter D3.

For example, the second diameter D2 may be greater than the first diameter D1, and the third diameter D3 may be greater than the second diameter D2. For example, the third diameter D3 may be equal to the second diameter D2.

For example, the first diameter D1 may be greater than a diameter (or size) of the first object 111, the second diameter D2 may be greater than a diameter (or size) of the second object 112, and the third diameter D3 may be greater than a diameter (or size) of the third object 113.

The depths of the first trap groove 341, the second trap groove 342, and the third trap groove 343 may be different, but are not limited thereto. The depth of the first trap groove 341 may be equal to or greater than a height of the first object 111, but is not limited thereto. The depth of the second trap groove 342 may be equal to or greater than a height of the second object 112, but is not limited thereto. The depth of the third trap groove 343 may be equal to or greater than a height of the third object 113, but is not limited thereto.

Meanwhile, the fourth trap region 315, the fifth trap region 316, and the sixth trap region 317 may each comprise a plurality of fourth trap grooves 344, a plurality of fifth trap grooves 345, and a plurality of sixth trap grooves 346.

The fourth trap groove 344, the fifth trap groove 345, and the sixth trap groove 346 may have different diameters D4, D5, and D6. In addition, the fourth trap groove 344, the fifth trap groove 345, and the sixth trap groove 346 may have sizes corresponding to the fourth object 114, the fifth object 115, and the sixth object 116 (or the first object 111, the second object 112, and the third object 113), respectively.

The fourth trap region 315 may have a fourth trap groove 344 having a fourth diameter D4, the fifth trap region 316 may have a fifth trap groove 345 having a fifth diameter D5, and the sixth trap region 317 may have a sixth trap groove 346 having a sixth diameter D6.

For example, the fifth diameter D5 may be greater than the fourth diameter D4, and the sixth diameter D6 may be greater than the fifth diameter D5. For example, the sixth diameter D6 may be the same as the fifth diameter D5.

For example, the fourth diameter D4 may be greater than a diameter (or size) of the fourth object 114, the fifth diameter D5 may be greater than a diameter (or size) of the second object 112, and the sixth diameter D6 may be greater than a diameter (or size) of the third object 113.

Meanwhile, the first diameter D1 and the fourth diameter D4 may be the same, but is not limited thereto. The second diameter D2 and the fifth diameter D5 may be the same, but is not limited thereto. The third diameter D3 and the sixth diameter D6 may be the same, but is not limited thereto.

The depths of the fourth trap groove 344, the fifth trap groove 345, and the sixth trap groove 346 may be different, but are not limited thereto. The depth of the fourth trap groove 344 may be equal to or greater than a height of the fourth object 114 (or the first object 111), but is not limited thereto. The depth of the fifth trap groove 345 may be equal to or greater than a height of the fifth object 115 (or the second object 112), but is not limited thereto. The depth of the sixth trap groove 346 may be equal to or greater than a height of the sixth object 116 (or the third object 113), but is not limited thereto.

Meanwhile, the first object 111, the second object 112, and the third object 113 loaded into the first loading section 314 by the rotational motion of the at least one or more magnet 331 and 332 may move away from the first loading section 314 at different moving speeds, and may be separated into a first cluster consisting of the first objects 111, a second cluster consisting of the second objects 112, and a third cluster consisting of the third objects 113. The first objects 111 included in the first cluster may be trapped in a plurality of first trap grooves 341 of the first trap region 311, the second objects 112 included in the second cluster may be trapped in a plurality of second trap grooves 342 of the second trap region 312, and the third objects 113 included in the third cluster may be trapped in a plurality of third trap grooves 343 of the third trap region 313.

In addition, the fourth object 114, the fifth object 115, and the sixth object 116 (or the first object 111, the second object 112, and the third object 113) loaded into the second loading section 318 by the rotational motion of the at least one or more magnet 331 and 332 may be separated into a fourth cluster consisting of the fourth objects 114 (or the first objects 111), a fifth cluster consisting of the fifth objects 115 (or the second objects 112), and a sixth cluster consisting of the sixth objects 116 (or the third objects 113) by moving away from the second loading section 318 at different moving speeds. The fourth objects 114 (or the first objects 111) included in the fourth cluster may be trapped in the fourth trap region 315, the fifth objects 115 (or the second objects 112) included in the fifth cluster may be trapped in the fifth trap region 316, and the sixth objects 116 (or the third objects 113) included in the sixth cluster may be trapped in the sixth trap region 317.

Figure 20:
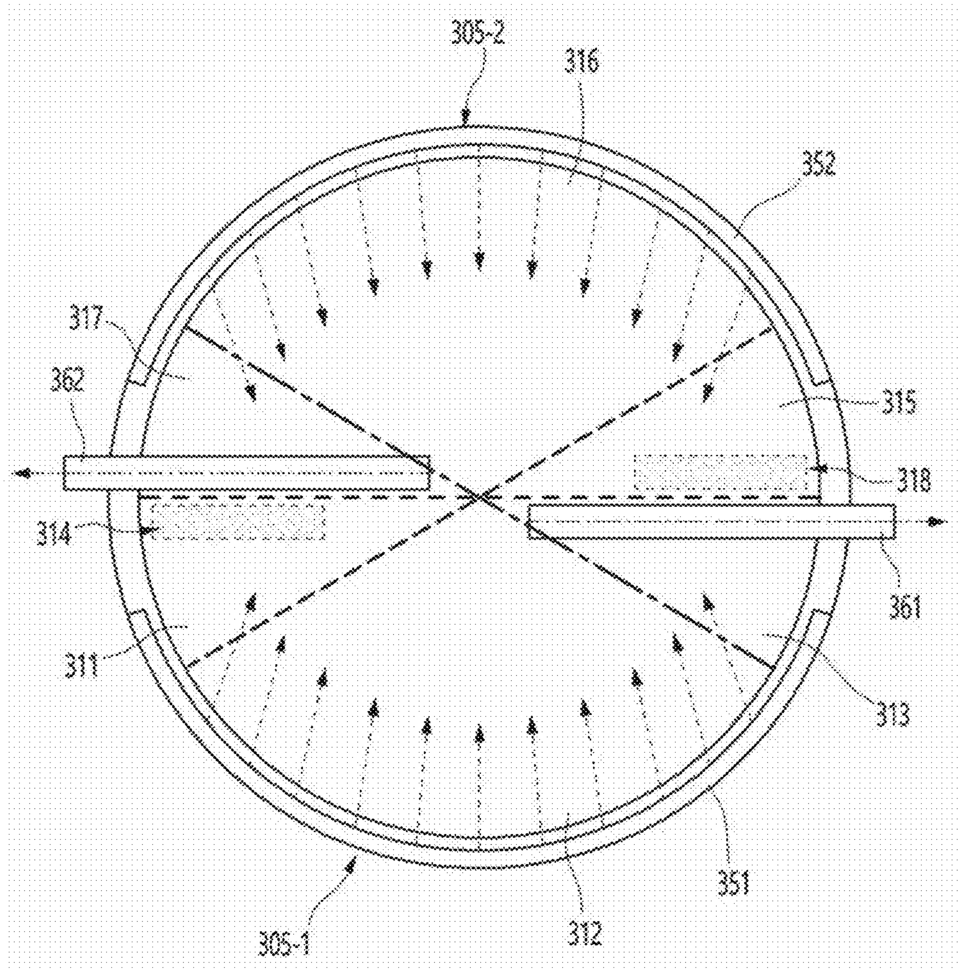
FIG. 20 is a plan view illustrating a liquid supply section and a liquid discharge section in a foreign matter removal device according to the second embodiment.
Figure 21:
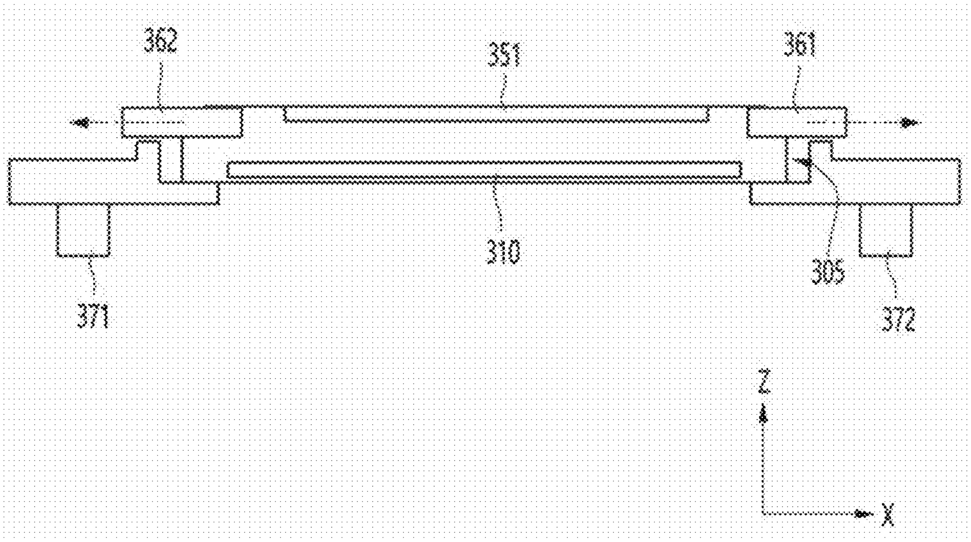
FIG. 21 is a cross-sectional view illustrating a liquid supply section, a liquid discharge section, and an ultrasound generator in a foreign matter removal device according to the second embodiment.

FIG. 20 is a plan view illustrating a liquid supply section and a liquid discharge section in a foreign matter removal device according to the second embodiment. FIG. 21 is a cross-sectional view illustrating a liquid supply section, a liquid discharge section, and an ultrasound generator in a foreign matter removal device according to the second embodiment.

Referring to FIG. 20 and FIG. 21, the foreign matter removal device 301 according to the second embodiment may comprise at least one or more liquid supply section 351 and 352, at least one or more liquid discharge section 361 and 362, and at least one or more ultrasound generator 371 and 372.

The liquid supply sections 351 and 352 may be positioned on one side of the chamber 305 to supply liquid into the chamber 305. For example, the first liquid supply section 351 may be positioned on a first side of the chamber 305, and the second liquid supply section 352 may be positioned on a second side of the chamber 305. The first liquid supply section 351 and the second liquid supply section 352 may be symmetrical to each other with respect to the center of the chamber 305. The drawing illustrates two liquid supply sections 351 and 352, but more liquid supply sections may be provided than these.

The liquid supply sections 351 and 352 may be liquid supply pipes built into a side wall, but are not limited thereto. The liquid supply pipes may be disposed lengthwise along a rounded side wall, but are not limited thereto. The liquid supply sections 351 and 352 may comprise a plurality of nozzles (not illustrated) connected to the liquid supply pipes and the inner side of the side wall to simultaneously supply liquid provided to one or both sides of the liquid supply pipes into the chamber 305. Each of nozzles may be provided with a valve (not illustrated) capable of blocking the supply of liquid.

The liquid may be supplied into the chamber 305 through the liquid supply sections 351 and 352, and the first object 111, the second object 112, and the third object 113 may be loaded into the fluid 320 filled in the chamber 305 through the first loading section 314. Then, the at least one or more magnet 331 and 332 of each of the plurality of magnet assemblies 330 may reciprocally move, so that the first object 111, the second object 112, and the third object 113 may be trapped in the first trap region 311, the second trap region 312, and the third trap region 313, respectively.

The liquid discharge sections 361 and 362 may be disposed near the first loading section 314 and/or the second loading section 318. For example, the first liquid discharge section 361 may be disposed adjacent to the second loading section 318 to penetrate the inner and outer surfaces of the first side wall of the chamber 305, and the second liquid discharge section 362 may be disposed adjacent to the first loading section 314 to penetrate the inner and outer surfaces of the second side wall of the chamber 305. Although two liquid discharge sections 361 and 362 are illustrated in the drawing, more liquid discharge sections may be provided than these.

The liquid discharge sections 361 and 362 may be liquid discharge pipes built into the side wall of the chamber 305, but are not limited thereto. The liquid discharge pipes may be installed to penetrate the inner and outer surfaces of a side surface of the chamber 305, but are not limited thereto. The liquid discharge sections 361 and 362 may discharge liquid to the outside through one side of the liquid discharge pipe.

The liquid discharge sections 361 and 362 may comprise a plurality of nozzles (not illustrated) connected to the liquid discharge pipe and the inner side of the second side wall so that the liquid inside the chamber 305 may be discharged to the outside at the same time. Each of the nozzles may be provided with a valve (not illustrated) for blocking from the outside.

When the chamber 305 is cleaned or the fluid 320 filled inside the chamber 305 is contaminated, the fluid 320 may be discharged to the outside through the liquid discharge sections 361 and 362.

The liquid supply sections 351 and 352 may be positioned higher from the ground than the liquid discharge sections 361 and 362, so that the liquid may be filled into the chamber 305 more quickly and the liquid inside the chamber 305 may be discharged to the outside more quickly. For example, the liquid supply sections 351 and 352 may be positioned on an upper side of the first side wall, and the liquid discharge sections 361 and 362 may be positioned on a lower side of the second side wall. The liquid discharge sections 361 and 362 may be positioned higher from the ground than the trap substrate 310.

The ultrasound generators 371 and 372 may generate ultrasonic waves to be supplied to the fluid 320 within the chamber 305. The ultrasound generator 371 and 372 have been described in the first embodiment (FIG. 15), so that a detailed description thereof will be omitted.

As described above, the third object 113 or the sixth object 116 may be a composite lump in which at least two or more of organic, inorganic, metal, and semiconductor light-emitting elements are combined. Even though the semiconductor light-emitting element included in the composite lump is a normal semiconductor light-emitting element, it may be included in the composite lump and be trapped in the third trap region 313 or the sixth trap region 317 and discarded.

However, since the ultrasonic waves generated from the ultrasound generators 371 and 372 are applied to the fluid 320 in the chamber 305, the fluid 320 may be vibrated by the ultrasonic waves, and the composite lump may be disintegrated by this vibration, and may be separated into organic fragments, inorganic fragments, metal fragments, semiconductor light-emitting elements, etc. In this way, since the semiconductor light-emitting element is separated from the composite lump and trapped in the second trap region 312 or the fifth trap region 316, the discard rate of the semiconductor light-emitting element can be reduced, and the manufacturing cost can be reduced.

Meanwhile, the display device described above may be a display panel. That is, in the embodiment, the display device and the display panel may be understood to have the same meaning. In an embodiment, the display device in a practical sense may comprise a display panel and a controller (or processor) capable of controlling the display panel to display an image.

The above detailed description should not be construed as limiting in all respects and should be considered illustrative.

The scope of the embodiment should be determined by reasonable interpretation of the appended claims, and all changes within the equivalent range of the embodiment are included in the scope of the embodiment.

INDUSTRIAL APPLICABILITY

The embodiment can be adopted in the display field for displaying images or information. The embodiment can be adopted in the display field for displaying images or information using a semiconductor light-emitting element. The semiconductor light-emitting element can be a micro-level semiconductor light-emitting element or a nano-level semiconductor light-emitting element.

For example, the embodiment may be adopted in a TV, signage, a smart phone, a mobile phone, a mobile terminal, a HUD for an automobile, a backlight unit for a laptop computer, and a display device for VR or AR.

The invention claimed is:

1. A foreign matter removal device, comprising:
- a chamber comprising a fluid; and
- a magnet assembly under the chamber,
- wherein the chamber comprises:
- a loading section configured to load a first object, a second object, and a third object into the fluid;
- a first trap region configured to trap the first object;
- a second trap region configured to trap the second object and to be adjacent to the first trap region; and
- a third trap region configured to trap the third object and to be adjacent to the second trap region,
- wherein the magnet assembly is configured to repeatedly reciprocate at least one or more magnet through the first trap region, the second trap region, and the third trap region,
- wherein the first object is a first foreign matter, the second object is a semiconductor light-emitting element, and the third object is a second foreign matter, and
- wherein the first trap region has a first trap groove having a first diameter, the second trap region has a second trap groove having a second diameter greater than the first diameter, and the third trap region has a third trap groove with a third diameter greater than the second diameter.

2. The foreign matter removal device of claim 1, wherein an intensity of magnetization of the second object is greater than an intensity of magnetization of the first object, and an intensity of magnetization of the third object is greater than the intensity of magnetization of the second object.

3. The foreign matter removal device of claim 1, wherein a size of the second object is greater than a size of the first object, and a size of the third object is greater than the size of the second object.

4. The foreign matter removal device of claim 1, wherein the magnet assembly comprises a plurality of magnet assemblies along a width direction of the first trap region, the second trap region, and the third trap region, and
- wherein the plurality of magnet assemblies each comprise:
- at least one or more magnet;
- a rail on which the at least one or more magnet is mounted and which repeatedly reciprocates the at least one or more magnet through the first trap region, the second trap region, and the third trap region; and
- at least one or more motor configured to drive the rail.

5. The foreign matter removal device of claim 4, whereon the rail is configured to reciprocate along an up-and-down direction relative to the first trap region, the second trap region, and the third trap region.

6. The foreign matter removal device of claim 4, the rail is configured to reciprocate along a horizontal direction relative to the first trap region, the second trap region, and the third trap region.

7. The foreign matter removal device of claim 1, wherein the chamber comprises:
- a second loading section;
- a fourth trap region adjacent to the third trap region;
- a fifth trap region adjacent to the fourth trap region; and
- a sixth trap region between the fifth trap region and the first trap region.

8. The foreign matter removal device of claim 7, wherein each of the first trap region, the second trap region, the third trap region, the fourth trap region, the fifth trap region, and the sixth trap region are configured to be in contact at a center of the chamber and have a circular shape along an outer perimeter thereof.

9. The foreign matter removal device of claim 7, wherein the first trap region, the second trap region, and the third trap region are symmetrical to each other with respect to the fourth trap region, the fifth trap region, and the sixth trap region with respect to the center of the chamber.

10. The foreign matter removal device of claim 7, wherein the magnet assembly is configured to rotate the at least one or more magnet with respect to the center of the chamber to pass through the sixth trap region, the fifth trap region, the fourth trap region, the third trap region, the second trap region, and the first trap region.

11. The foreign matter removal device of claim 7, wherein the loading section is disposed on the first trap region, and the second loading section is disposed on the fourth trap region.

12. The foreign matter removal device of claim 7, wherein the fourth trap region has a fourth trap groove having a fourth diameter, the fifth trap region has a fifth trap groove having a fifth diameter greater than the fourth diameter, and the sixth trap region has a sixth trap groove having a sixth diameter greater than the fifth diameter.

13. The foreign matter removal device of claim 12, wherein the first diameter and the fourth diameter are the same, the second diameter and the fifth diameter are the same, and the third diameter and the sixth diameter are the same.

14. The foreign matter removal device of claim 7, wherein the second loading section is configured to load a fourth object, a fifth object, and a sixth object into the fluid, the fourth trap region is configured to trap the fourth object, the fifth trap region is configured to trap the fifth object, and the sixth trap region is configured to trap the sixth object.

15. The foreign matter removal device of claim 14, wherein the fourth object is the first foreign matter, the fifth object is the semiconductor light-emitting element, and the sixth object is the second foreign matter.

16. The foreign matter removal device of claim 7, wherein the second trap region is configured to trap the first object, the second object, and the third object, the second loading section is configured to load the first object, the second object, and the third object trapped in the second trap region by using the fluid, the fourth trap region is configured to trap the first object, the fifth trap region is configured to trap the second object, and the sixth trap region is configured to trap the third object.

17. The foreign matter removal device of claim 7, wherein the magnet assembly comprises:
- at least one or more magnet;

a support plate on which the at least one or more magnet is mounted and which rotates the at least one or more magnet with respect to a center of the chamber to pass through the first trap region, the second trap region, the third trap region, the fourth trap region, the fifth trap region, and the sixth trap region; and a motor configured to drive the support plate.

18. The foreign matter removal device of claim 1, comprising:

at least one or more liquid supply section on a first side of the chamber; and at least one or more liquid discharge section on a second side of the chamber.

19. The foreign matter removal device of claim 1, comprising:

at least one or more ultrasound generator configured to generate ultrasonic waves for supplying the fluid.

* * * * *